(12) United States Patent
Keret et al.

(10) Patent No.: US 11,743,288 B2
(45) Date of Patent: *Aug. 29, 2023

(54) SYSTEM AND METHOD FOR GENERATING AND IMPLEMENTING A REAL-TIME MULTI-FACTOR AUTHENTICATION POLICY ACROSS MULTIPLE CHANNELS

(71) Applicant: NICE LTD., Ra'anana (IL)

(72) Inventors: Matan Keret, Oulu (FI); Itay Harel, Kfar Saba (IL); Amit Sharon, Hod-Hasharon (IL)

(73) Assignee: Nice Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,228

(22) Filed: Apr. 1, 2022

(65) Prior Publication Data
US 2022/0232035 A1 Jul. 21, 2022

Related U.S. Application Data

(63) Continuation of application No. 16/506,683, filed on Jul. 9, 2019, now Pat. No. 11,336,682.

(51) Int. Cl.
*H04L 29/00* (2006.01)
*H04L 9/40* (2022.01)

(52) U.S. Cl.
CPC ...... *H04L 63/1466* (2013.01); *H04L 63/0861* (2013.01); *H04L 63/1433* (2013.01); *H04L 2463/082* (2013.01)

(58) Field of Classification Search
CPC ............. H04L 63/1466; H04L 63/0861; H04L 63/1433; H04L 2463/082; H04L 63/20;
(Continued)

(56) References Cited

U.S. PATENT DOCUMENTS 8,646,060 B1 * 2/2014 Ben Ayed ............... H04W 4/20
726/9
10,701,067 B1 * 6/2020 Ziraknejad ............ H04W 12/63
(Continued)

OTHER PUBLICATIONS

PAN-OS Administrator's Guide Version 9.0, www.paloaltonetworks.com/documentation, Oct. 21, 2019, 1294 pages.
(Continued)

*Primary Examiner* — Don G Zhao
(74) *Attorney, Agent, or Firm* — Pearl Cohen Zedek Latzer Baratz LLP

(57) ABSTRACT

Systems and methods for generating and implementing a real-time multi-factor authentication policy across multiple channels, are configured to: during a pre-authentication stage: receive, via a user interface, information defining one or more scenarios; receive, via the user interface, information defining one or more authentication flows; for each of the one or more scenarios, map one of the one or more authentication flows to a given scenario; and generate a multi-factor authentication policy associated with each of the one or more scenarios; and during a real-time authentication stage: upon receiving an interaction, identify, by a decision engine, a relevant scenario of the one or more scenarios; implement, by the decision engine, the multi-factor authentication policy associated with the relevant scenario; and determine, by the decision engine, an authentication result.

24 Claims, 17 Drawing Sheets

(58) Field of Classification Search
CPC ......... H04M 3/493; H04M 2203/6054; H04W 12/63; H04W 12/06; H04W 12/72

See application file for complete search history.

(56) References Cited

U.S. PATENT DOCUMENTS

| | | | | |
|---|---|---|---|---|
| 10,764,752 | B1* | 9/2020 | Avetisov | H04W 12/068 |
| 10,887,307 | B1* | 1/2021 | Newstadt | H04L 63/102 |
| 11,336,682 | B2* | 5/2022 | Keret | H04L 63/1433 |
| 2010/0107225 | A1* | 4/2010 | Spencer | H04W 12/069 726/4 |
| 2011/0046938 | A1* | 2/2011 | Morizawa | G06F 30/33 703/28 |
| 2014/0189841 | A1 | 7/2014 | Metke et al. | |
| 2015/0256554 | A1* | 9/2015 | Sakakibara | H04L 63/1425 726/25 |
| 2016/0050234 | A1 | 2/2016 | Choyi et al. | |
| 2016/0087957 | A1* | 3/2016 | Shah | H04L 63/205 726/1 |
| 2016/0149883 | A1* | 5/2016 | Arunkumar | H04L 67/306 726/7 |
| 2017/0099278 | A1* | 4/2017 | Ducatel | G06F 21/6218 |
| 2017/0148009 | A1* | 5/2017 | Perez Lafuente | H04L 63/20 |
| 2017/0185765 | A1* | 6/2017 | Pang | H04W 12/065 |
| 2017/0272418 | A1* | 9/2017 | Kim | H04L 63/08 |
| 2017/0324737 | A1* | 11/2017 | Evans | H04L 63/06 |
| 2017/0331816 | A1* | 11/2017 | Votaw | H04L 63/0861 |
| 2017/0331817 | A1* | 11/2017 | Votaw | G06F 21/42 |
| 2018/0032707 | A1* | 2/2018 | Sakamoto | H04L 63/083 |
| 2018/0097788 | A1 | 4/2018 | Murthy | |
| 2018/0103341 | A1* | 4/2018 | Moiyallah, Jr. | G06F 3/04842 |
| 2018/0234411 | A1* | 8/2018 | Masiero | H04L 63/0853 |
| 2018/0332016 | A1* | 11/2018 | Pandey | H04L 63/0428 |
| 2019/0044942 | A1* | 2/2019 | Gordon | G06K 9/00536 |
| 2019/0080066 | A1* | 3/2019 | Van Os | G06V 40/172 |
| 2019/0104121 | A1* | 4/2019 | Khandani | H04L 9/0869 |
| 2019/0159029 | A1* | 5/2019 | Li | H04W 12/06 |
| 2019/0222576 | A1* | 7/2019 | Borkar | H04L 63/0884 |
| 2020/0034831 | A1* | 1/2020 | Blatt | G06Q 20/382 |
| 2020/0125713 | A1* | 4/2020 | Davis | G06F 16/958 |
| 2020/0145823 | A1* | 5/2020 | Nair | H04W 12/06 |
| 2020/0153844 | A1* | 5/2020 | Tang | G06F 21/316 |
| 2020/0389552 | A1 | 12/2020 | Trim et al. | |
| 2021/0044976 | A1* | 2/2021 | Avetisov | H04L 9/321 |

OTHER PUBLICATIONS

PAN-OS Administrator's Guide Version 7.1, www.paloaltonetworks.com/documentation, Oct. 21, 2019, 920 pages.

PAN-OS Web Interface Help Version 9.0 www.paloaltonetworks.com/documentation, Oct. 21, 2019, 810 pages.

Eric B., How to Design a Stateless REST Login with 2 Factor Authentication, Jan. 23, 2017, 4 pages, https://stackoverflow.com/questions/41814194/how-to-design-a-stateless-rest-login-with-2-factor-authentication-2fa.

Peter Locke, Getting Token authentication Right in a Stateless Singe Page Application, Jul. 7, 2017, 15 pages, https://medium.com/lightrail/getting-token-authentication-right-in-a-stateless-single-page-application-57d0c647e3.

PAN-OS Administrator's Guide Version 11.0, www.paloaltonetworks.com, Mar. 7, 2023, 684 pages https://docs.paloaltonetworks.com/pan-os/11-0/pan-os-admin/authentication/configure-an-authentication-profile-and-sequence.

PAN-OS Web Interface Help Version 11.0 www.paloaltonetworks.com, Feb. 22, 2023, 1176 pages https://docs.paloaltonetworks.com/pan-os/11-0/pan-os-web-interface-help/device/device-authentication-sequence.

How to use authentication sequence for GlobalProtect to work with local accounts and LDAP accounts, Oct. 16, 2020 last modified Aug. 26, 2021, 1 page, https://knowledgebase.paloaltonetworks.com/KCSArticleDetail?id=kA14u000000HBEPCA4.

Panorama Administrator's Guide Version 11.0, www.paloaltonetworks.com, Mar. 8, 2023, 584 pages, https://docs.paloaltonetworks.com/panorama/11-0/panorama-admin/panorama-overview/role-based-access-control/authentication-profiles-and-sequences.

* cited by examiner

```
MFA Result:
    Status=[Success]
    Request:
        Id=[10001]
        CallSource=[LIVE_CALL]
        OnDemand=[False]
    Interaction:
        Id=[10000]
        ContactQMTStartTime=[2018-07-18 11:43:47,708]
        Channel=[LiveCall]
        PolicyId=[5]
    Decision Details:
        Decision=[FraudAlert]
        Reasons=[MultiFactorDecisionReached]
    SFA Results List:
        Count=[5]
        1) VOICE_BIOMETRICS Result:
            Status=[Success]
            Step=[1]
            Decision Details:
                Decision=[Mismatch]
                Reasons=[VoiceprintMismatch]
                Score=[96]
            SFA Decisions List:
                Count=[1]
                1) VOICE_BIOMETRICS Decision:
                    Decision Details:
                        Decision=[Mismatch]
                        Reasons=[VoiceprintMismatch]
                        Score=[96]
                    SpeakerId=[111]
                    NetAudio=[7.84]
```

FIG. 8A

```
2) CALLING_NUMBER Result:
        Status=[Success]
        Step=[2]
        Decision Details:
                Decision=[Mismatch]
                Reasons=[PhoneNumberVerified; GovernmentLine]
                Score=[800]
        SFA Decisions List:
                Count=[1]
                1) CALLING_NUMBER Decision:
                        Decision Details:
                                Decision=[Mismatch]
                                Reasons=[PhoneNumberVerified; GovernmentLine]
                                Score=[800]
                        PhoneNumber=[1234]
                        LineType=[Mobile]
                        Carrier=[Verizon]
                        CountryCode=[US]
                        AniStatus=[NotActive]
                        CalledParty=[9876]
3) MOBILE_DEVICE Result:
        Status=[Success]
        Step=[3]
        Decision Details:
                Decision=[Mismatch]
                Score=[40]
        SFA Decisions List:
                Count=[1]
                1) MOBILE_DEVICE Decision:
                        Decision Details:
                                Decision=[Mismatch]
                                Score=[40]
                        Model=[LG G4]
                        IMEI=[1234567]
4) LOCATION Result:
        Status=[Success]
        Step=[4]
        Decision Details:
                Decision=[Mismatch]
                Score=[40]
        SFA Decisions List:
                Count=[1]
                1) LOCATION Decision:
                        Decision Details:
                                Decision=[Mismatch]
                                Score=[40]
                        Latitude=[123]
                        Longitude=[-456]
                        Distance=[3]
5) FINGER_PRINT Result:
        Status=[Success]
        Step=[4]
        Decision Details:
                Decision=[Mismatch]
        SFA Decisions List:
                Count=[1]
                1) FINGER_PRINT Decision:
                        Decision Details:
                                Decision=[Mismatch]
```

FIG. 8B

SYSTEM AND METHOD FOR GENERATING AND IMPLEMENTING A REAL-TIME MULTI-FACTOR AUTHENTICATION POLICY ACROSS MULTIPLE CHANNELS

PRIOR APPLICATION DATA

The present application is a continuation application of prior U.S. patent application Ser. No. 16/506,683, filed on Jul. 9, 2019 entitled "SYSTEM AND METHOD FOR GENERATING AND IMPLEMENTING A REAL-TIME MULTI-FACTOR AUTHENTICATION POLICY ACROSS MULTIPLE CHANNELS", incorporated herein by reference in its entirety.

FIELD OF THE INVENTION

The present invention is in the field of real-time multi-factor authentication. In particular, the present invention is directed to generating and implementing a real-time multi-factor authentication policy across multiple channels.

BACKGROUND OF THE INVENTION

In a call center, significant improvements and savings may be had if authentication of callers is performed in real-time and by an automated system using various different methods of authentication. In today's Real-Time Authentication world, a single authentication factor is usually not sufficient. Most financial organizations would like to use multiple authentication factors in order to be more efficient and customer friendly. Additionally, use of multiple authentication factors would allow more services in self-service channels, eliminate live agents' manual authentication efforts in risky transactions, expose and prevent fraud attempts in real time, and help in conforming with regulation requirements.

Presently, there are different authentication methods provided by many different vendors. Each authentication method (and vendor) typically operates as a standalone authentication. The user needs to integrate with each vendor separately and each request to a vendor usually has a separate financial and resource-related cost.

Furthermore, each service channel (for example, live call, Interactive Voice Response ("IVR") system, mobile, text, instant message, etc.) for communication with customers is a standalone as well. In order to try and save costs, the user needs to maintain a state, i.e., knowing which authentication method or methods have been used thus far. However, these systems usually pass little information between them. If the user wants to leverage a previously recorded authentication result, it is not trivial to accomplish across multiple service channels. The caller may drop a call at any point of the call flow, and saving a local cache of information regarding the call may be problematic since it may be unclear when the information gathered should be removed.

What is needed, therefore, is a solution such that users can generate and implement a real-time multi-factor authentication policy across multiple channels.

SUMMARY OF EMBODIMENTS OF THE INVENTION

An embodiment of the invention includes method for generating and implementing a real-time multi-factor authentication policy across multiple channels, the method performed on a computer having a processor, memory, and one or more code sets stored in the memory and executing in the processor, the method comprising: during a pre-authentication stage: receiving, via a user interface, information defining one or more scenarios; receiving, via the user interface, information defining one or more authentication flows; for each of the one or more scenarios, mapping, by the processor, one of the one or more authentication flows to a given scenario; and generating a multi-factor authentication policy associated with each of the one or more scenarios; and during a real-time authentication stage: upon receiving an interaction, identifying, by a decision engine, a relevant scenario of the one or more scenarios; implementing, by the decision engine, the multi-factor authentication policy associated with the relevant scenario; and determining, by the decision engine, an authentication result.

In some embodiments, a given scenario includes at least one scenario parameter and at least one corresponding parameter value. In some embodiments, a given authentication flow includes: at least one analysis vertex, in which the at least one analysis vertex represents one of a collection of available authentication methods to execute during an authentication stage; at least one condition vertex, in which the at least one condition vertex represents a matrix containing a collection of one or more predicates defining one or more conditions for a given result of each authentication method; and at least one decision vertex, in which the at least one decision vertex represents one of a plurality of potential authentication results of a given authentication flow.

In some embodiments, the authentication result is satisfied if all predicates in the collection of one or more predicates are determined to be true. In some embodiments, a given authentication flow is mapped to a given scenario based on a user indication linking the authentication flow and the scenario. In some embodiments, an authentication result indicates a relative strength of the authentication.

Some embodiments of the invention may further include determining a fraud suspicion level result based on implementation of the multi-factor authentication policy, wherein the fraud suspicion level result indicates a relative level of suspicion of fraud. Some embodiments of the invention may further include providing to a user, via the user interface, a scenario generator, the scenario generator comprising one or more parameter selection boxes for selecting one or more of a plurality of scenario parameters, and one or more value selection boxes for selecting one or more of a plurality of corresponding parameter values, in which for each scenario parameter selected, a corresponding parameter value is also selected.

Some embodiments of the invention may further include providing to the user, via the user interface, an authentication flow generator, the authentication flow generator including: one or more authentication method selection boxes for selecting one or more of a plurality of authentication methods; one or more condition selection boxes for selecting one or more of a plurality of conditions to be associated with a given authentication method; one or more predicate selection boxes for selecting one or more of a plurality of predicates to be associated with a given condition; and one or more decision selection boxes for selecting a potential authentication result to be associated with the given authentication method.

In some embodiments, one or more authentication flows is executed at least one of in parallel and in series. Some embodiments of the invention may further include monitoring by the decision engine, a frequency with which a given scenario is identified; prioritizing the given scenario when the frequency meets a predefined threshold; and modifying at least one scenario parameter or at least one corresponding parameter value when the frequency does not meet the predefined threshold.

Some embodiments of the invention may further include monitoring by the decision engine, an authentication failure rate of the multi-factor authentication policy associated with the relevant scenario; and when the authentication failure rate meets a predefined threshold, modifying, by the decision engine, at least one authentication flow mapped to the given scenario.

Some embodiments of the invention may further include monitoring by the decision engine, a fraudulent detection rate of the multi-factor authentication policy associated with the relevant scenario; when the fraudulent detection rate does not meet a predefined threshold, modifying, by the decision engine, at least one authentication flow mapped to the given scenario; and when the fraudulent detection rate meets a predefined threshold, prioritizing the relevant scenario.

Some embodiments of the invention may further include monitoring by the decision engine, a frequency with which a given scenario is identified; prioritizing the given scenario when the frequency meets a predefined threshold; and modifying at least one scenario parameter or at least one corresponding parameter value when the frequency does not meet the predefined threshold. Some embodiments of the invention may further include monitoring by the decision engine, an authentication failure rate of the multi-factor authentication policy associated with the relevant scenario; and when the authentication failure rate meets a predefined threshold, modifying, by the decision engine, at least one authentication flow mapped to the given scenario.

Some embodiments of the invention may further include monitoring by the decision engine, a fraudulent detection rate of the multi-factor authentication policy associated with the relevant scenario; when the fraudulent detection rate does not meet a predefined threshold, modifying, by the decision engine, at least one authentication flow mapped to the given scenario; and when the fraudulent detection rate meets a predefined threshold, prioritizing the relevant scenario.

Systems according to embodiments of the above methods may be provided. These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIGS. 8A and 8B show a second part of a multi-factor authentication (MFA) simulation is shown according to embodiments of the invention;

Figure 1:
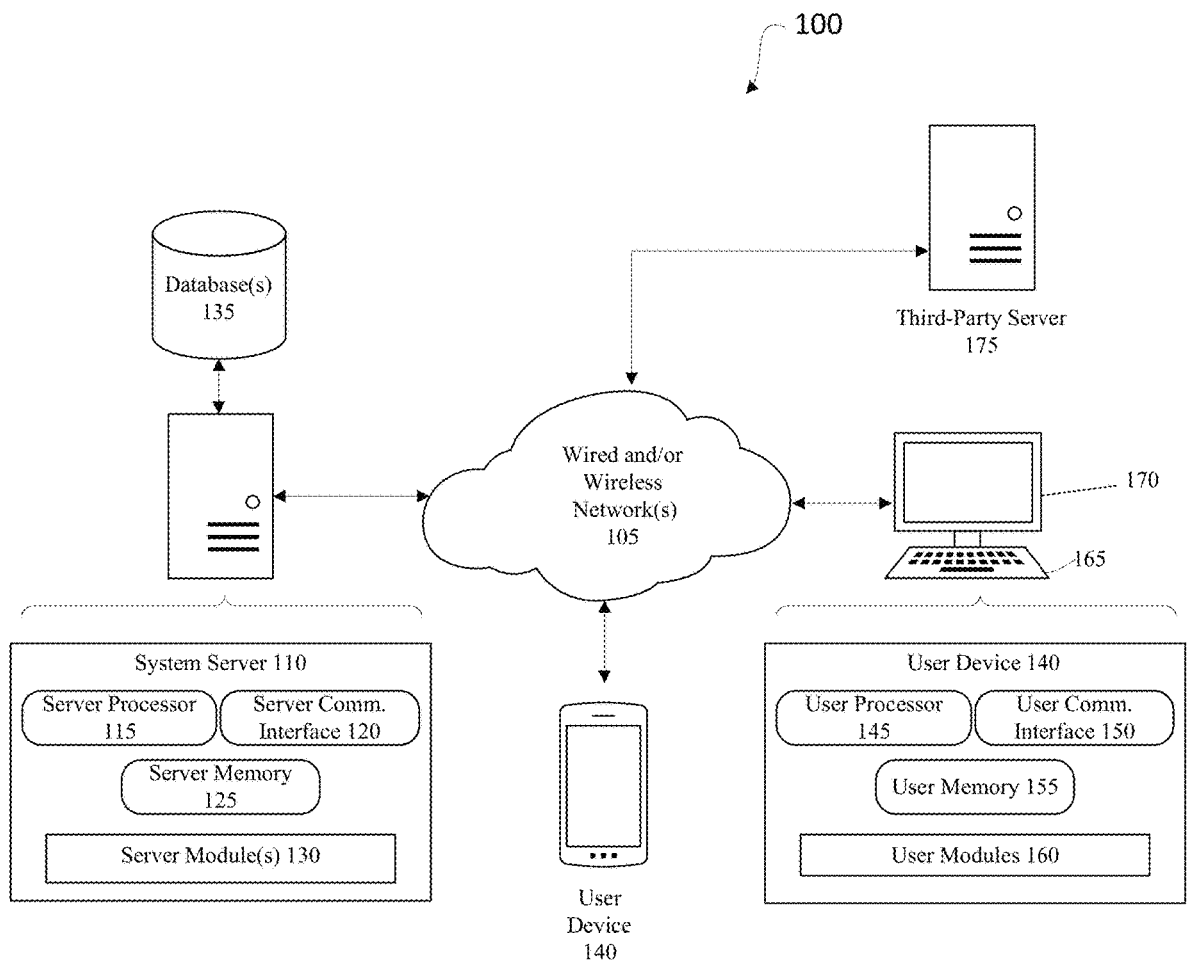
FIG. 1 shows a high-level diagram illustrating an example configuration of a system 100 for generating and implementing a real-time multi-factor authentication policy across multiple channels, according to at least one embodiment of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Embodiments of the invention are designed to be implemented in an automated authentication system, for example, systems that are set for a call center that has several contact channels, such as, e.g., a self-service application\website, an IVR system, and a call-center, etc. A core component according to some embodiments of the invention is a "smart" decision engine. The decision engine's purpose is to enable the organization to focus on business scenarios in which various methods of authentication may be required, while the system is configured to manage and implement the authentications.

In some embodiments of the invention, multi-factor authentication (hereinafter "MFA") systems and methods may be provided, e.g., for enterprise service providers, which, in some embodiments, support their multi-channels with a smart decision engine as described herein. A smart decision engine offers flexibility and yet is oriented to the business needs and lingual requirements of enterprise service providers. In some embodiments, the invention may provide both authentication and detection of fraudulent activity, as described herein. Furthermore, embodiments of the invention may provide a solution that is stateless, oriented to simple scaling out, and accommodates robustness needs without limits.

Embodiments of the invention enable the user to set up various authentication policies that define how different business scenarios trigger multi-factor authentication flows, indicate the authentication strength, and provide a fraudulent activity alert. By providing a smart decision engine that can act as the system's "brain" and combine multiple authentication methods and company policies in real-time, embodiments of the invention may provide a strong indication of suspicious fraudulent activity while supporting all the different contact channels an enterprise may have.

FIG. 1 shows a high-level diagram illustrating an example configuration of a system 100 for generating and implementing a real-time multi-factor authentication policy across multiple channels, according to at least one embodiment of the invention. System 100 includes network 105, which may include a private operational network, the Internet, one or more telephony networks, one or more network segments including local area networks (LAN) and wide area networks (WAN), one or more wireless networks, or a combination thereof. In some embodiments, system 100 may include a system server 110 constructed in accordance with one or more embodiments of the invention. In some embodiments, system server 110 may be a stand-alone computer system. In other embodiments, system server 110 may include a decentralized network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is therefore intended to represent various forms of digital computers, such as laptops, desktops, workstations, personal digital assistants, servers, blade servers, edger servers, mainframes, and other appropriate computers and/or networked or cloud-based computing systems capable of employing the systems and methods described herein.

In some embodiments, system server 110 may include a server processor 115 which is operatively connected to various hardware and software components that serve to enable operation of the system 100. Server processor 115 may serve to execute instructions to perform various operations relating to various functions of embodiments of the invention as described in greater detail herein. Server processor 115 may be one or a number of processors, a central processing unit (CPU), a graphics processing unit (GPU), a multi-processor core, or any other type of processor, depending on the particular implementation.

System server 110 may be configured to communicate via communication interface 120 with various other devices connected to network 105. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain implementations, a server memory 125 may be accessible by server processor 115, thereby enabling server processor 115 to receive and execute instructions such a code, stored in the memory and/or storage in the form of one or more server modules 130, each module representing one or more code sets. The server modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by, for example, executing code or software, and may execute the functionality of the modules as described herein. The one or more server modules 130 may be executed by server processor 115 to facilitate interaction and/or various execute functionalities between and among system server 110 and the various software and hardware components of system 100, such as, for example, server database(s) 135, user device(s) 140, and/or third party system(s) 175 as described herein.

Of course, in some embodiments, server module(s) 130 may include more or less actual modules which may be executed to enable these and other functionalities of the invention. The modules described herein are therefore intended to be representative of the various functionalities of system server 110 in accordance with some embodiments of the invention. It should be noted that in accordance with various embodiments of the invention, server module(s) 130 may be executed entirely on system server 110 as a stand-alone software package, partly on system server 110 and partly on one or more of user device 140 and/or third party system(s) 175, or entirely on user device 140 and/or third party system(s) 175.

Server memory 125 may be, for example, a random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more database(s) 135, for example, directly or remotely via network 105. Database 135 may include any of the memory configurations as described herein, and may be in direct or indirect communication with system server 110. In some embodiments, database 135 may store information related to one or more aspects of the invention.

As described herein, among the computing devices on or connected to the network 105 may be one or more user devices 140. User device 140 may be any standard computing device. As understood herein, in accordance with one or more embodiments, a computing device may be a stationary computing device, such as a desktop computer, kiosk and/or other machine, each of which generally has one or more processors, such as user processor 145, configured to execute code to implement a variety of functions, a user communication interface 150, for connecting to the network 105, a computer-readable memory, such as user memory 155, one or more user modules, such as user module 160, one or more input devices, such as input devices 165, and one or more output devices, such as output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, communicate with system server 110.

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smart-phones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, user device 140 may be a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140 and/or third party server 175. Likewise, in some embodiments, one or more modules of user module 160, which is depicted in FIG. 1 as existing and executing on user device 140, may additionally or alternatively exist and/or execute on system server 110 and/or third party server 175. In some embodiments, third-party server 175 may provide the same or similar structure and/or functionality as system server 110, but may be owned, possessed, and/or operated by a third-party.

Figure 2:
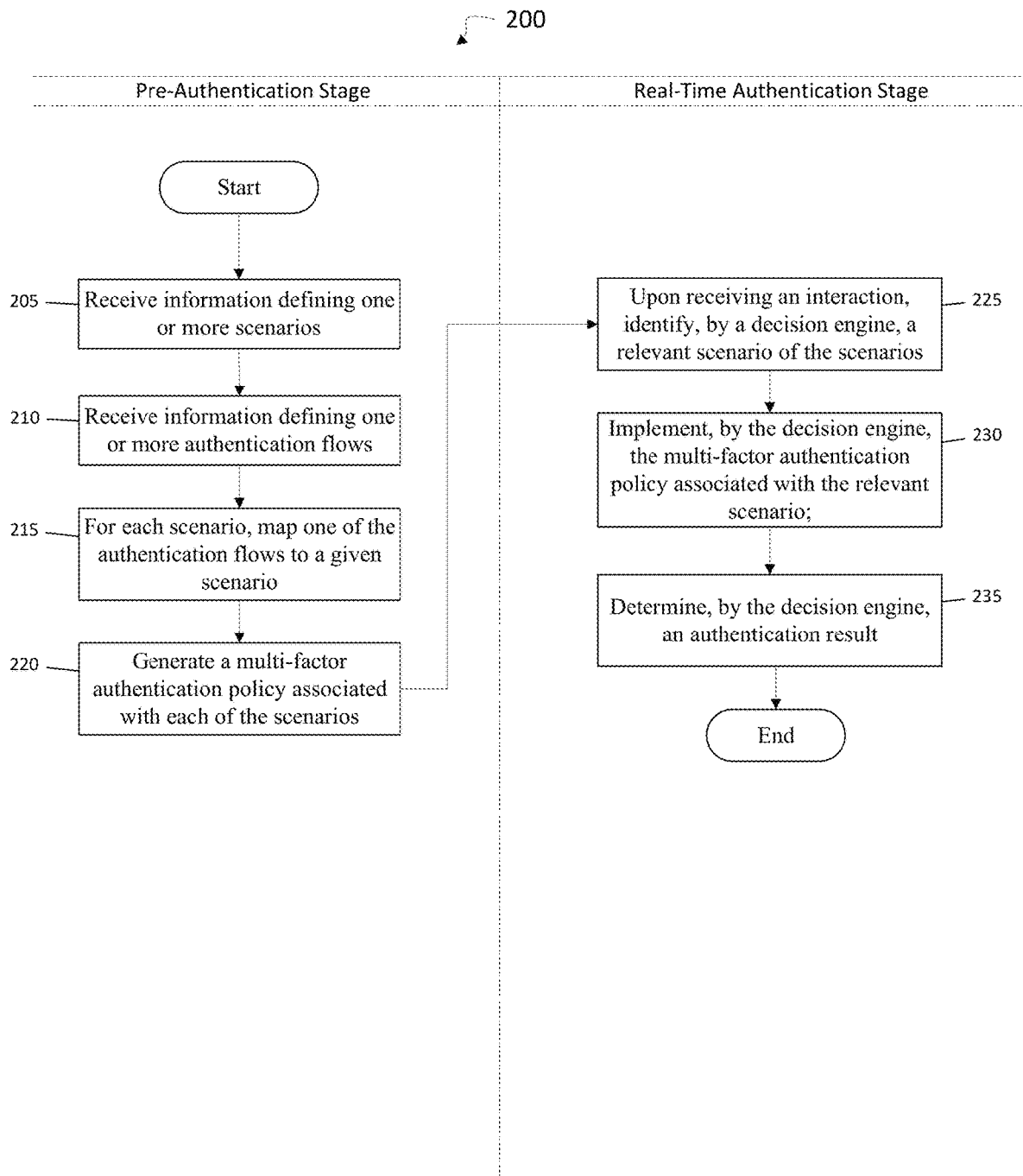
FIG. 2 is a high-level diagram illustrating an example configuration of a method workflow 200 for generating and implementing a real-time multi-factor authentication policy across multiple channels according to at least one embodiment of the invention.

FIG. 2 is a high-level diagram illustrating an example configuration of a method workflow 200 for generating and implementing a real-time multi-factor authentication policy across multiple channels according to at least one embodiment of the invention. As described herein, embodiments of systems and methods of the invention include at least two main stages: a pre-authentication stage and a real-time authentication stage. In some embodiments, method workflow 200 may be performed on a computer (e.g., system server 110) having a processor (e.g., server processor 115), memory (e.g., server memory 125), and one or more code sets or software (e.g., server module(s) 130) stored in the memory and executing in or executed by the processor. Method workflow 200 begins with a pre-authentication process, at step 205, when the processor is configured to receive, via a user interface, information defining one or more scenarios.

A scenario, as understood herein, defines a possible situation that may occur or that may otherwise exist, in a line of business of a user, organization, company, etc. In some embodiments a user may be prompted to create, via a user interface, as many business-related scenarios as it may need in order to describe any possible situations in its line of business in which authentication and/or fraud detection may be required or desired.

Figure 3:
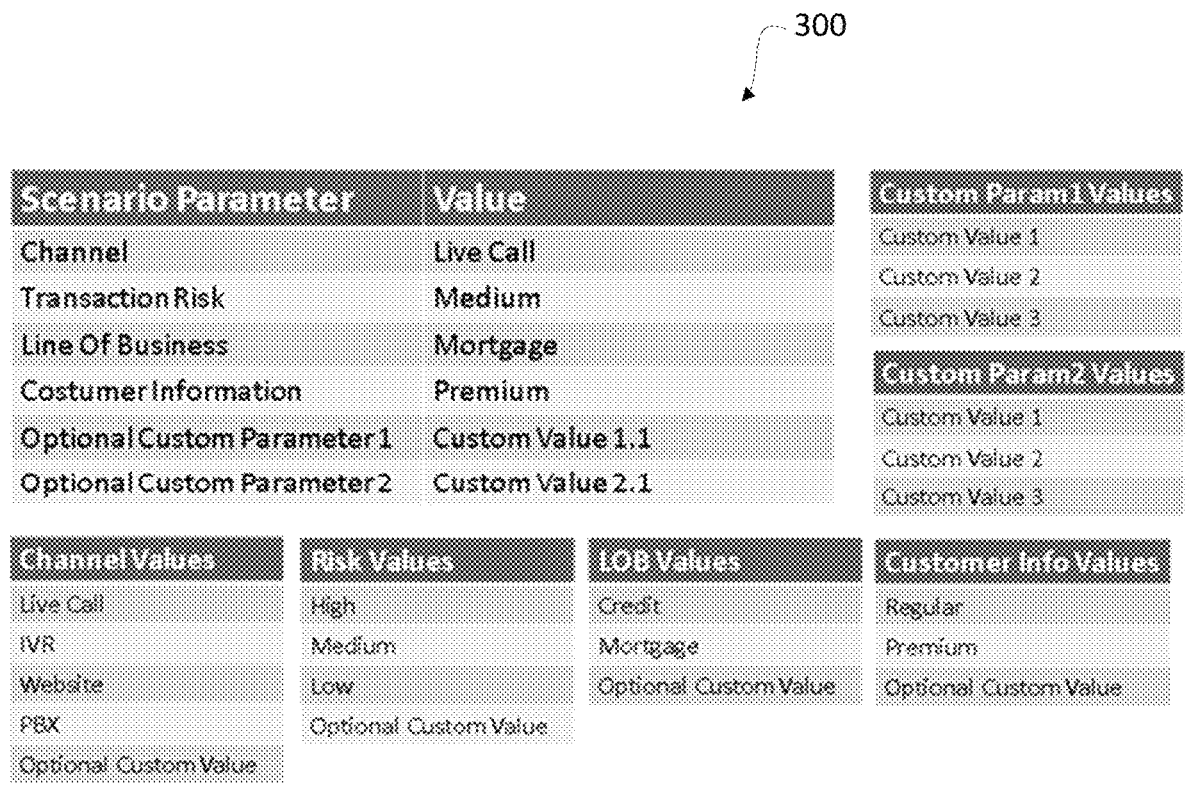
FIG. 3 shows a table showing various parameters for defining a given scenario is provided according to at least one embodiment of the invention.

Turning briefly to FIG. 3, a table 300 showing various parameters for defining a given scenario is provided according to at least one embodiment of the invention. In some embodiments, a scenario may be represented by a table such as table 300. Each entry in the table 300 may be a pair of a scenario parameter and its assigned value. In some embodiments, the assigned value may be selected from a collection of possible values for each parameter. In some embodiments, a scenario may be fully generic and dynamic. In some embodiments, a user interface may be provided in which different and/or additional parameters and/or assigned values may be defined and/or provided.

In some embodiments of the invention, an initial set of scenario parameters and corresponding values may be provided, and the organization may be provided the ability to modify and/or add as many parameters and/or values as it may require in order to cover all relevant scenarios. For example, table 300 references four provided scenario parameters (i.e., Channel, Transaction Risk, Line of Business, and Customer Information) and two user-added custom scenario parameters (i.e., Optional Custom Parameter 1 and Optional Custom Parameter 2), as well as corresponding values for each. Of course, those skilled in the art will recognize that in various embodiments additional and/or alternative scenario parameters and/or parameter values may be provided and/or added are necessary. As explained herein, in some embodiments, as an interaction is taking place in real-time, systems and methods according to embodiments of the invention may pass the current real-time scenario (i.e., the scenario reflecting the real-time interaction) to an Application Programming Interface (API) in order to trigger the suitable authentication flow.

Returning to FIG. 2, at step 210, the processor may be configured to receive, e.g., via the user interface, information defining one or more authentication flows. As understood herein, an authentication flow represents a prescribed course of action for addressing authentication and/or fraud detection needs. More specifically, in some embodiments the authentication flow describes the process that a decision engine (described in detail herein) may perform in real time in order to achieve its decision regarding a prescribed course of action. In some embodiments, a user (e.g., an individual, organization, company, or a representative thereof) may create, e.g., via a user interface, as many authentication flows as may be needed, e.g., to address the various contemplated scenarios. In some embodiments of the invention one or more initial templates may be provided which may then be modified and/or reused.

Figure 4:
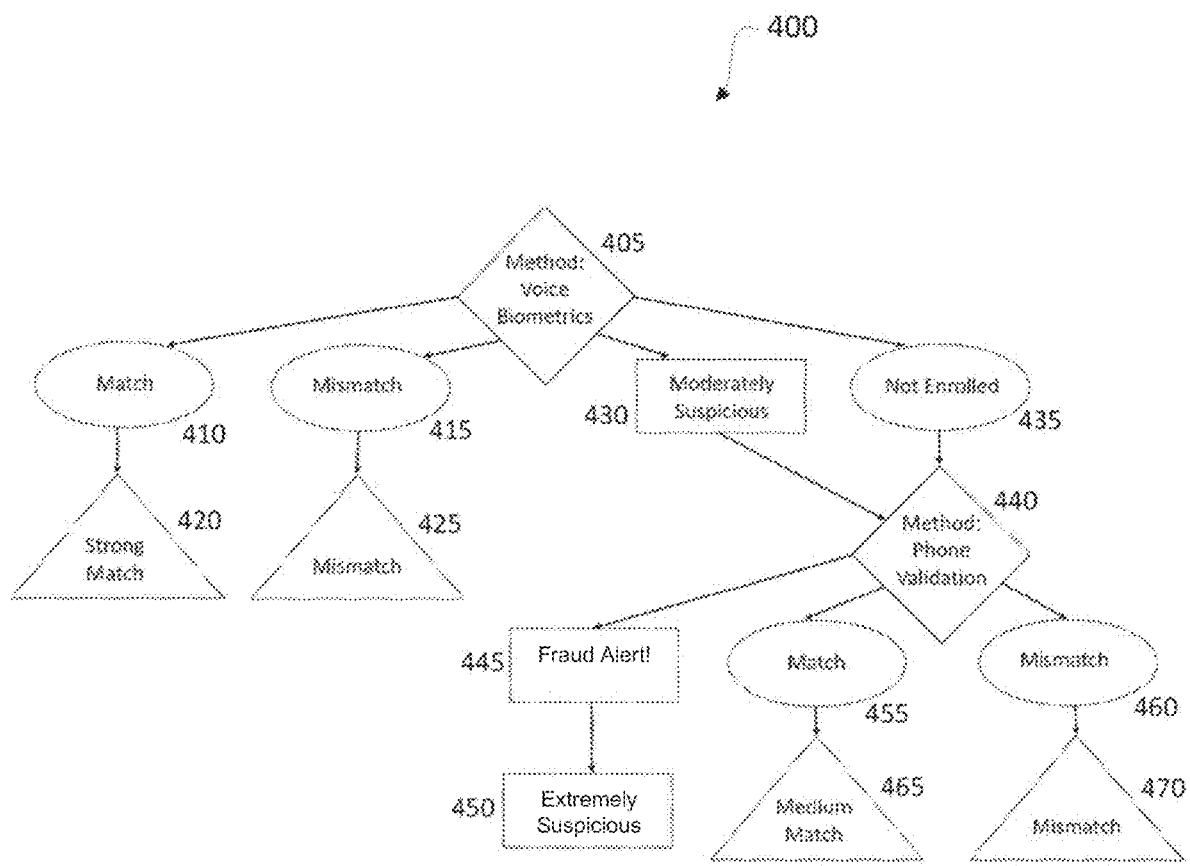
FIG. 4 shows an example authentication flow represented as a tree data structure, according to at least one embodiment of the invention.

Turning briefly to FIG. 4, in some embodiments, an authentication flow may be represented by a tree data structure, an example of which is shown according to embodiments of the invention. In some embodiments, an authentication flow tree, such as example tree 400, may be partially or fully dynamic and, in some embodiments, may be constructed from any valid combination of at least the following "Flow Vertices":

Analysis Vertex (indicated by a diamond shape in FIG. 4): an Analysis Vertex represents one of a collection of available authentication methods to execute during an authentication stage. For example, an Analysis Vertex may be a Voice Biometrics authentication, a Phone Validation authentication, etc., as indicated in example tree 400. In some embodiments, this vertex may result in a collection of the corresponding authentication results received from the executed methods.

Condition Vertex (indicated by an oval or rectangle in FIG. 4): a Condition Vertex represents a matrix containing a collection of one or more predicates defining one or more conditions for a given result of each authentication method. In some embodiments, each predicate may apply a condition on one of the authentication result fields. In some embodiments, an authentication result may be satisfied if all its assigned predicate results are true. A Condition vertex may therefore be satisfied if its entire matrix results are true. In some embodiments, each authentication result may hold several fields. For example, Voice Biometrics authentication results may hold fields such as 'authentication status', 'score', 'speech duration', etc. In some embodiments, a predicates collection may be assigned to each authentication result.

For example, in example tree 400, the first predicate may be applied to the 'authentication status' field and will test if its value equals to 'Match'. The second predicate will apply on the 'score' field and will test if its value is greater than '50' and, and so on. Hence, an authentication result may be satisfied if all its assigned predicates results are true. A Condition vertex is satisfied if its entire set of matrix results are true. In some embodiments, the amount of predicates per each authentication result, the field to test in each predicate, the operator to apply (e.g., equals, greater than, etc.) in each predicate and the expected value for each field may be fully configurable. Note, in example tree 400, generally more benign condition vertices are indicated with an oval (e.g., match, mismatch, not enrolled, etc.) whereas potentially more malicious condition vertices are indicated with a rectangle (e.g., moderately suspicious, extremely suspicious, fraud alert, etc.). Of course, it will be understood by those of skill in the art that in other embodiments, vertices may be represented in a variety of different ways (e.g., using different shapes and/or using colors, line-types, combinations, etc.).

Decision Vertex (indicated by a triangle in FIG. 4): a Decision Vertex represents one of a plurality of potential authentication results of a given authentication flow. In some embodiments, this vertex may indicate, e.g., whether or not the current real-time situation is authenticated or not, how strong the level of the authentication is, whether or not there is any suspicion of fraudulent activity, and/or how strong the suspicion is.

In example authentication flow decision tree 400, at first only Voice Biometrics 405 will be used for both authenticating the client and comparing it to a pre-defined fraudster watch list. In case of a match 410 (e.g., matching an authenticated client/contact) or mismatch 415 (e.g., the client/contact does not match any known fraudsters on a predefined list or it does not match the individual's voiceprint—pointing that it is suspicious), the results are clearly set: Strong Match 420 or Mismatch 425, respectively. In case there is a match to a fraudster 430, or if the client/contact is not yet enrolled for voice biometrics 435, in this example, another method may then be executed: verifying the client/contact's phone device and/or calling number 440. If the yielded result is another fraud indication 445, it is considered as an extremely suspicious interaction 450 and an alert will result, e.g., in real-time. In case of a match 455 (e.g., matching an authenticated client/contact) or mismatch 460 (e.g., the client/contact does not match any known fraudsters on a predefined list), the results are clearly set after this step as well: Medium match 465 or Mismatch 470. Of course, those skilled in the art will recognize that many combinations of analysis vertices, condition vertices, and decision vertices may be created in order to generate various authentication flows. The decision tree can be constructed in any manner. In some embodiments, several methods may be executed simultaneously, only as a dependency of previously executed methods, or any combination thereof. The yielded results can also be configured in any type of manner.

Figure 5:
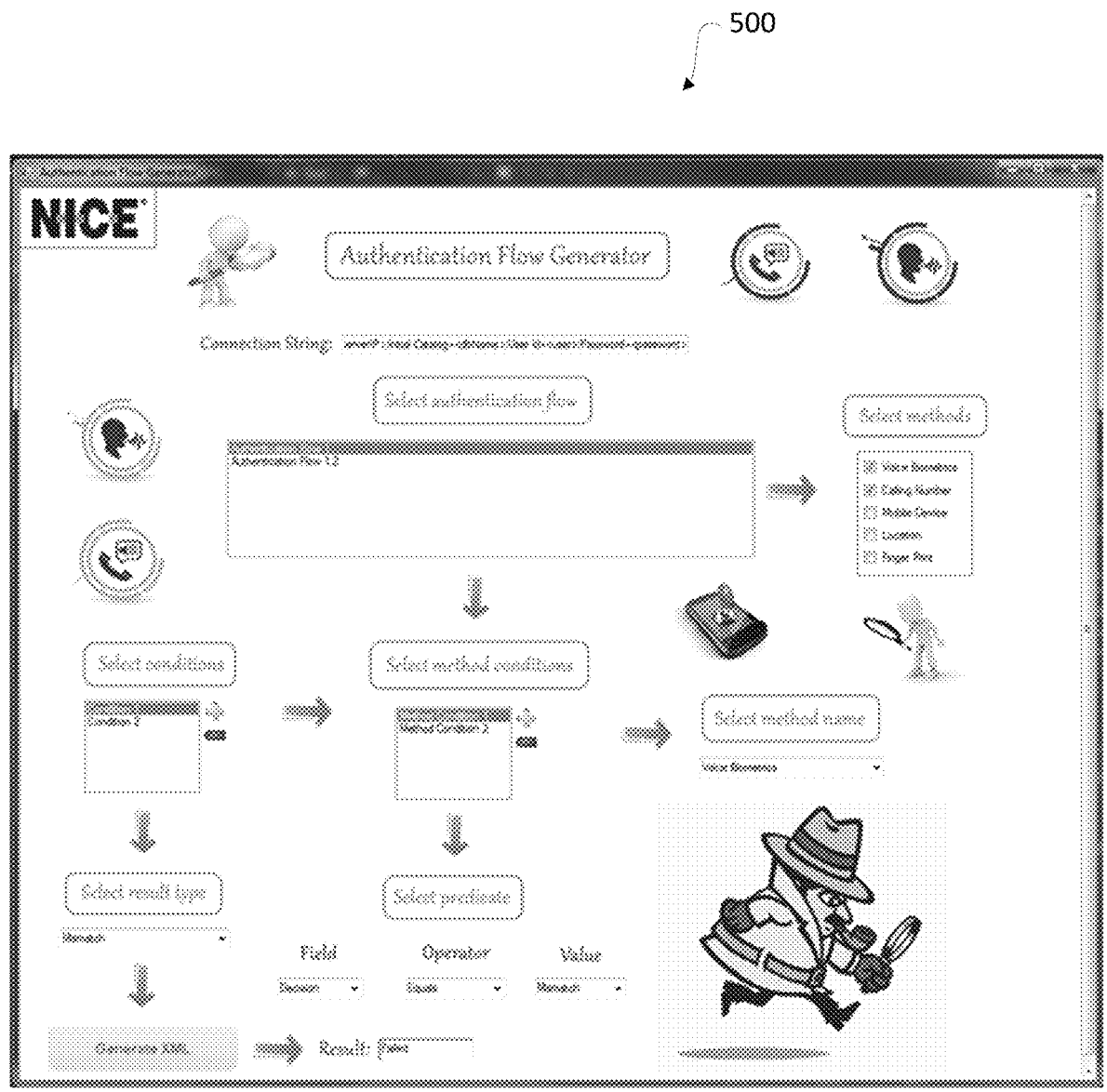
FIG. 5 shows a user interface of an Authentication Flow Generator and an example flow creation, according to at least one embodiment of the invention.

Turning to FIG. 5, a user interface of an Authentication Flow Generator and an example flow creation are shown according to an embodiment of the invention. In some embodiments, the user may create any number of Authentication flows using Authentication Flow Generator 500. Each flow may consist of one or more authentication methods. In some embodiments, a user may make various selections and inputs in the user interface of Authentication Flow Generator 500, as shown in the example flow creation (indicated with arrows). As seen on the left-hand side of the user interface, the user may select which conditions would lead to executing an authentication method. In some embodiments, any number of conditions may be added. For example: success of a Calling Number authentication method execution should lead to an execution of Voice Biometrics method. For each chosen method, there may be several results. In some embodiments, the user may choose how to handle a result, for example: Assume that a condition leads to use Voice Biometrics, or, if the decision of Voice Biometrics is Mismatch, the end result should be Mismatch (even if previous methods succeeded), etc.

Returning to FIG. 2, at step 215, for each scenario, the processor may be configured to map one of the authentication flows to a given scenario. In some embodiments this may be based on a manual instruction, e.g., of a user. In some embodiments, a given authentication flow may be mapped to a given scenario based on a user indication, e.g., in a user interface, linking the authentication flow and the scenario. In some embodiments, this may be implemented automatically or semi-automatically, e.g., using artificial intelligence and/or machine learning to determine the optimal authentication flow or appropriate options to map to a given scenario. In some embodiments, further automatic and/or semi-automatic optimization may be implemented, as described herein. In some embodiments, mapping an authentication flow to a given scenario links or otherwise associates the authentication flow to the given scenario such that when the given scenario occurs, the mapped authentication flow is executed.

In some embodiments, at step 220, the processor may be configured to generate a multi-factor authentication policy associated with each of the one or more scenarios. As understood herein, the mapping of a scenario to an authentication flow is denoted as a policy. As explained in further detail herein, in some embodiments, the decision engine may rely in whole or in part on one or more of the various defined policies to derive the logic for executing authentication and/or fraud detection. In some embodiments, using a user interface, a user (e.g., an organization) can link a scenario to the desired authentication flow and create as many policies as it may need. In some embodiments, by modeling a policy to be consisted of two parts—a scenario and an authentication flow—embodiments of the invention allow a clean separation of roles and responsibilities that typically exist in an organization. For example, by bifurcating scenario identification and authentication flow design responsibilities, security experts can focus on predefining different execution flows and cover different business scenarios at the backend; application users can focus on identifying relevant business scenarios, without being exposed to the authentication flow that will be executed as a result.

This may also be important for preventing security breaches and manipulation of the system by hackers or fraudsters. In some embodiments, the backend execution logic may be modified at any given time, e.g., to create a level of randomness in execution of authentication methods. Of course, in some embodiments, this process may be automated as well.

Figure 6:
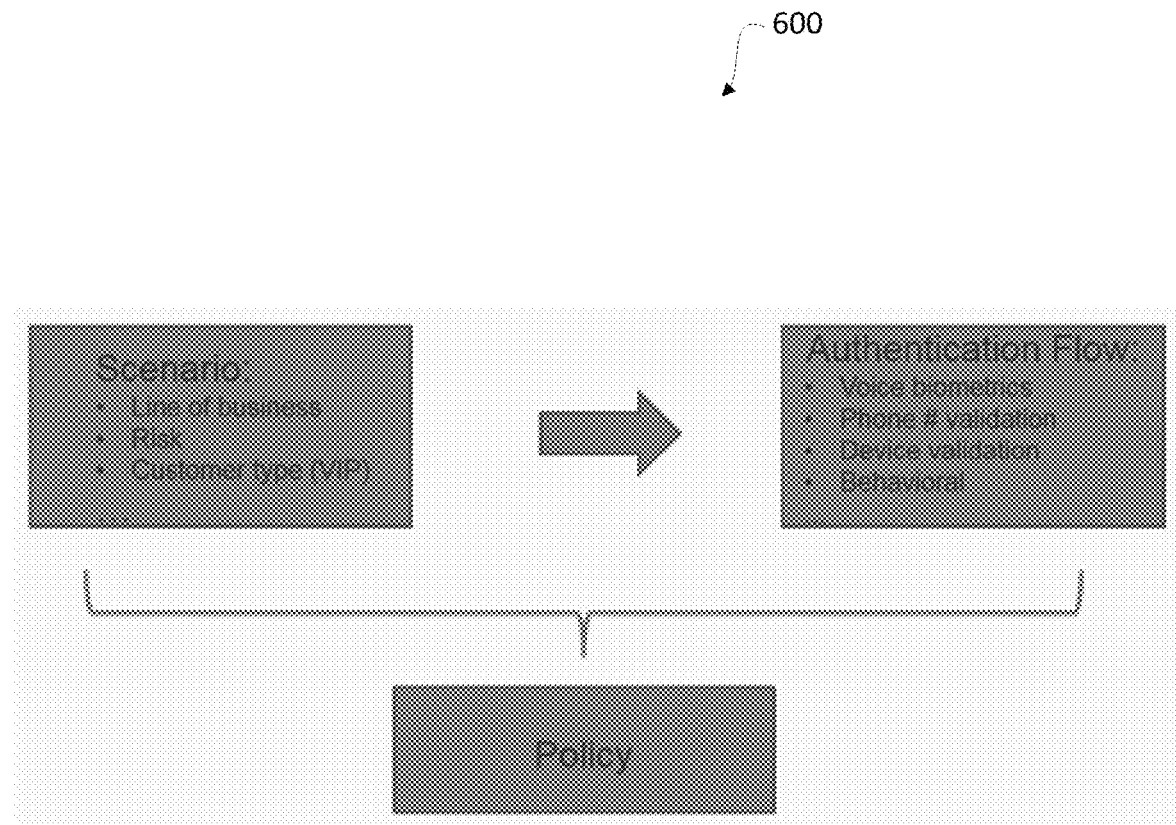
FIG. 6 is a diagram showing the connection between a scenario to its associated authentication flow, deriving an authentication policy, according to at least one embodiment of the invention.

Turning briefly to FIG. 6, the connection between a scenario to its associated authentication flow, deriving an authentication policy, is illustrated according to embodiments of the invention. As described herein, in various embodiments, a scenario may consist of any business-oriented parameters and an authentication flow may dictate which authentication methods will be executed and the relations between them. For example, scenarios may include line of business, risk, customer type (e.g., VIP), etc., and authentication flows may include voice biometrics, phone number validation, device validation, behavioral, etc. In some embodiments, policies generated in the pre-authentication stage may be implanted, e.g., by a decision engine as described herein, during a real-time authentication stage.

Returning to FIG. 2, during a real-time authentication stage (e.g., when authentication of interactions is desired), at step 225, in some embodiments, upon receiving an interaction, the processor may be configured to identify, e.g., by a decision engine, a relevant scenario of the one or more previously defined scenarios. In some embodiments, the decision engine may be a script or coded set of instructions which, when executed, identifies a relevant business scenario based on the received interaction. Next, at step 230, in some embodiments, the processor may implement, e.g., by the decision engine, the multi-factor authentication policy associated with the relevant scenario. In some embodiments, the decision engine may derive the authentication flow that should be executed for that scenario and thus implement the policy. In some embodiments, the decision engine may execute the authentication flow—which may include several methods of authentication (e.g., in parallel or in series). Finally, at step 235, in some embodiments, the processor may determine, e.g., by the decision engine, an authentication result. For example, the decision engine may derive an authentication result, e.g., measured by strength, for example, strong/medium/weak. Further, in some embodiments, the processor may be configured to derive a fraud suspicion level result, e.g., measured by strength, for example, extremely suspicious/moderately suspicious/low/not suspicious, etc., as described herein.

Embodiments of the invention are designed to provide the maximum authentication level to the call center's transactions. This may be achieved, for example, by allowing the organization to select from a variety of authentication methods, all of them integrated under the same solution. The organization may define its own tailor-made combination for authentication requirements for each possible scenario to achieve the best authentication behavior for any situation at the organization's call center.

In the modern real-time authentication world, there are several defined categories of authentication methods: (1) Something You Are, e.g., (a) Voiceprint; (b) Fingerprint; (c) Facial recognition; etc.; (2) Something You Have, e.g., (a) Cellular/Landline number or SIM card; (b) Mobile device; (c) Hand-held token; etc., and (3) Something You Know, e.g., (a) PIN number; (b) Password; (c) Last activity in your credit card; etc. The first category (Something You Are) is typically considered as the hardest to break. A combination of the methods significantly increases the security. Furthermore, each authentication method may be suitable for different channels. For example, in voice interactions one may use voiceprint and line number while fingerprint and face recognition may be used in mobile applications interactions.

Embodiments of the invention may include a plug-and-play infrastructure, allowing organizations to add, remove or/and change authentication methods within their flows easily and seamlessly. In some embodiments, this may be achieved by a layer of abstraction in the policy configuration: by using a generic abstract tree, the user focuses on which authentication methods to trigger when a certain scenario occurs. The authentication methods do not reveal the authentication providers. Such an architecture allows unlimited integrations with in-house and 3rd party authentication providers. Adding new authentication methods may be supported out of the box, by the design. Once the internal (e.g., backend) integration with a new provider is complete, the various methods exist in an authentication methods pool, fully transparent to the policy engine and the users. Then the users can simply choose and use the new method (or not).

Embodiments of the invention may evolve over time and become more powerful—keeping itself up-to-date, be flexible to the customers' needs, and may provide the precise great value and stronger than ever authentication combinations.

Figure 7:
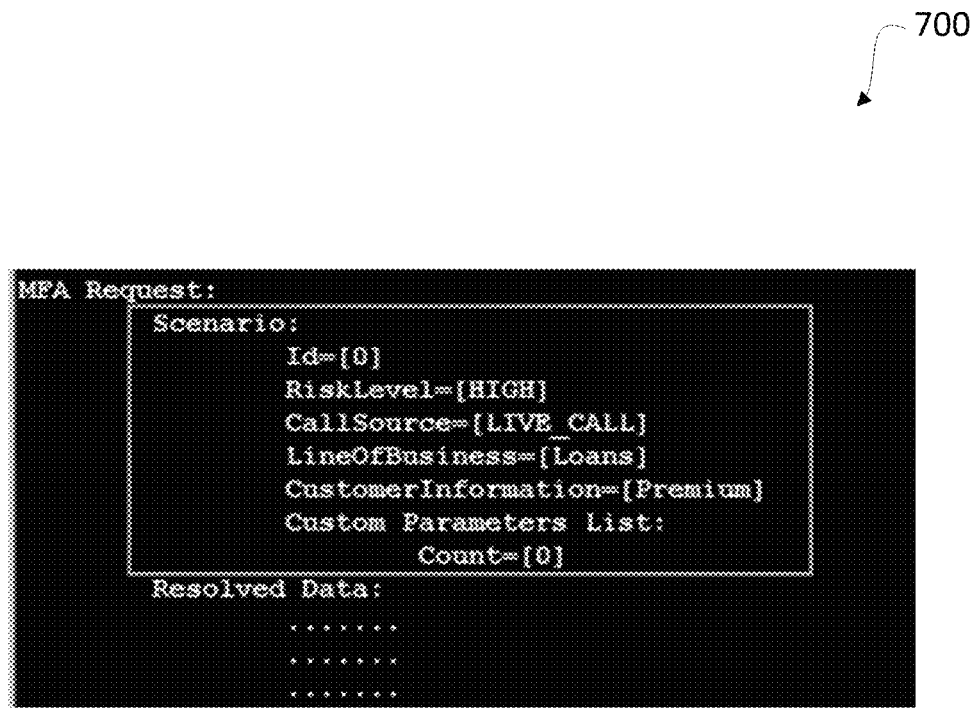
FIG. 7 shows a first part of a multi-factor authentication (MFA) simulation, according to embodiments of the invention.

Turning to FIG. 7, a first part of a multi-factor authentication (MFA) simulation is shown according to embodiments of the invention. In the example simulation, an MFA request 700 arrives at an organization's multi-factor authentication system. The scenario indicates several business-related inputs, including risk level, call source, line of business, etc. Based on the Scenario inputs, the decision engine is configured to find the predefined related policy and execute the linked authentication flow.

Turning to FIGS. 8A and 8B, a second part of a multi-factor authentication (MFA) simulation is shown according to embodiments of the invention. As can be seen in FIG. 8A, the scenario leads the decision engine to choose Policy #5 (indicated in the simulation as "PolicyID=[5]"). The final decision of the engine, based on the various authentication methods implemented in Policy #5, was a Fraud Alert (indicated in the simulation as "Decision=[FraudAlert]"). The next section of the simulation illustrates what led to the final decision: five authentication methods were executed as part of the multi-factor authentication flow executed by Policy #5. The first authentication method implemented was voice biometrics (indicated in the simulation as "1) VOICE_BIOMETRICS Result:"), and the result was a Mismatch (indicated in the simulation as "Decision=[Mismatch]").

Turning to FIG. 8B, the second authentication method implemented was a calling number verification (indicated in the simulation as "2) CALLING_NUMBER Result:"), and the result was a Mismatch (indicated in the simulation as "Decision=[Mismatch]"). The third authentication method implemented was a mobile device verification (indicated in the simulation as "3) MOBILE_DEVICE Result:"), and the result was a Mismatch (indicated in the simulation as "Decision=[Mismatch]").

The fourth authentication method implemented was a location check (indicated in the simulation as "4) LOCATION Result:"), and the result was a Mismatch (indicated in the simulation as "Decision=[Mismatch]"). The fifth and final authentication method implemented was a fingerprint verification (indicated in the simulation as "4) FINGER_PRINT Result:"), and the result was a Mismatch (indicated in the simulation as "Decision=[Mismatch]").

It should be noted that in the example simulation, the first three authentication methods were performed in succession (indicated in the simulation as "Step=[1]", "Step=[2]", and "Step=[3]", respectively), followed by the final two authentication methods, which were performed in parallel (both indicated in the simulation as being "Step=[4]"). Of course, embodiments of the invention enable various combinations of authentication methods, assignment of order of execution, and whether different authentication methods are performed in series and/or parallel.

As described herein, embodiments of the invention are configured to address challenges associated with multiple service channel systems. Embodiment of the invention are designed to support today's modern organizations, which may offer services to their clients in multiple channels, such as live agents in a call center, self-service IVR systems, mobile platforms, websites, etc. Embodiments of the invention leverage authentication results from operations that have taken place in one channel when the transaction (e.g., communication) is being handed over to a different channel, for example, from an IVR system to a customer relationship management (CRM) system (and a live agent). Supporting such capability across service channels is typically challenging since each service channel is usually a standalone system and these systems usually pass little information between one another. In addition, the transaction may drop at any point of the interaction flow (e.g., a customer hangs up a phone or disconnects from an instant message chat) and therefore, solutions that include caching mechanisms are more problematic to implement and maintain.

Accordingly, some embodiments of the invention utilize a specially coded object, referred to herein as the NICE Call-Context object. In some embodiments, this object may be created upon the first authentication flow execution. The object then holds all the authentication information that is being accumulated, according to the relevant policy, during the transactions. In some embodiments, the object may be small and thus may be easily handed over between the different channels' systems (without overwhelming the system). In this way, the object is able to operate in all the standalone systems (for each of the channels), yet it holds previously obtained authentication results (e.g., for later use by the engine).

In some embodiments, re-usage of authentication results may be important for various reasons: (1) Step-up authentication across channels: re-usage enables dynamically strengthening the authentication with additional methods when the interaction's risk level is increasing during the transactions, and provides the best security level at each point. This is especially the case if a call is forwarded between channels; (2) re-usage may save costs while using 3rd party services: no need to re-trigger some methods more than once; (3) re-usage of authentication results enables a stateless and simple solution that achieves high availability; (4) re-usage of authentication results means the invention is not being affected by transaction drops in the middle of the flow; and (5) it enables calculating an appropriate, unified authentication result and a smart indication for suspicious fraudulent activity.

Figure 9:
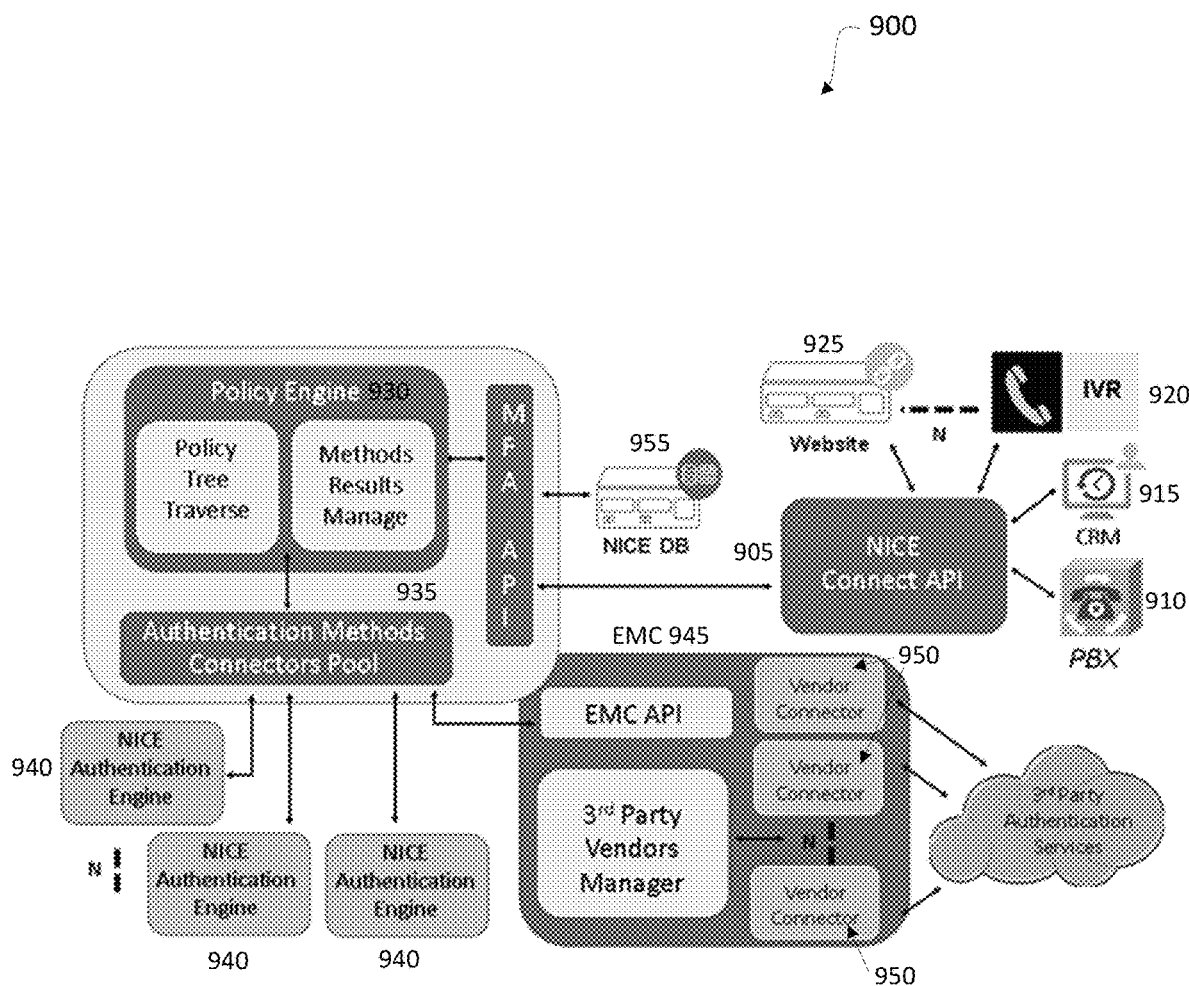
FIG. 9 shows an example system and software architecture 900 for generating and implementing a real-time multi-factor authentication (MFA) policy across multiple channels, according to some embodiments of the invention.

Turning to FIG. 9, an example system and software architecture 900 for generating and implementing a real-time multi-factor authentication (MFA) policy across multiple channels is provided according to some embodiments of the invention. In some embodiments, the components of system and software architecture 900 can be divided into three groups: (1) Call center components, such as: (i) Telephony system (PBX 910); (ii) Customer Relationship Management system (CRM 915); (iii) Interactive Voice Response system (IVR 920), etc.; (2) System services, such as: (i) Connect Application Programming Interface—an API gateway exposing the system services (NICE Connect API 905); (ii) Decision engine—contains the MFA logic (Policy Engine 930); (iii) Various Authentication Engines for each authentication system, e.g., voice biometrics system, fingerprint system, etc. (NICE Authentication Engine 940); (iv) Database—holding the solutions' metadata (NICE DB 955); (v) Other infrastructural services, such as System administrator and Users administrator (not shown), etc.; and (3) Third party authentication services, to which the system may connect, such as: phone validation providers and other vendors, etc.

In some embodiments, one or more organizational systems (e.g., one or more channels of communication with an organization) use a dedicated communication Application Programming Interface, referred to herein as the NICE Connect API 905, as a gateway for sending MFA requests to an MFA system server (e.g., system server 110) over a network (e.g., network 105). For example, one or more of PBX 910, CRM 915, IVR 920, and/or website 925 may each connect to the MFA system server via the NICE Connect API 905. In some embodiments, the server-side may include policy decision engine 930, which, among other things, may traverse the current scenario's policy tree and dispatch, via authentication methods connectors pool 935, the required authentication requests to the methods executors, e.g., one or more NICE Authentication Engine(s) 940 as part of an authentication flow being executed.

In some embodiments, an External Methods Connector component (denoted as EMC 945) may be used to send requests to third-party vendors, e.g., via one or more vendor connectors 950, while system authentication methods (i.e., in-house methods) may be executed directly via decision engine 930. In some embodiments, a dedicated third-party vendors manager system may be provided to facilitated coordination with various third-party authentication services.

In some embodiments, decision engine 930 may aggregate the authentication results and returns a smart, unified authentication decision to the client, as described herein. In some embodiments, the decision may include a fraudulent activity alert and/or a risk level indication. In some embodiments, results may be stored in NICE DB 955.

In some embodiments, as various authentication methods are implemented according to the policy, decision engine 930 may create and/or update the NICE Call-Context object and return it to the client. In some embodiments, as clients/users make various authentication requests, and as the system executes the various authentications, the system may be configured to pass the updated NICE Call-Context object each time to a different part of the authentication system. As described herein, this enables the system to use multiple sources of authentication information and to build on knowledge already attained, to ultimately provide a more accurate result. This is in stark contrast to prior art systems, which provide fragmented authentication. In some embodiments, clients may pass the NICE Call-Context object to another client in order to continue using it in upcoming requests for the same interaction.

Figure 10A:
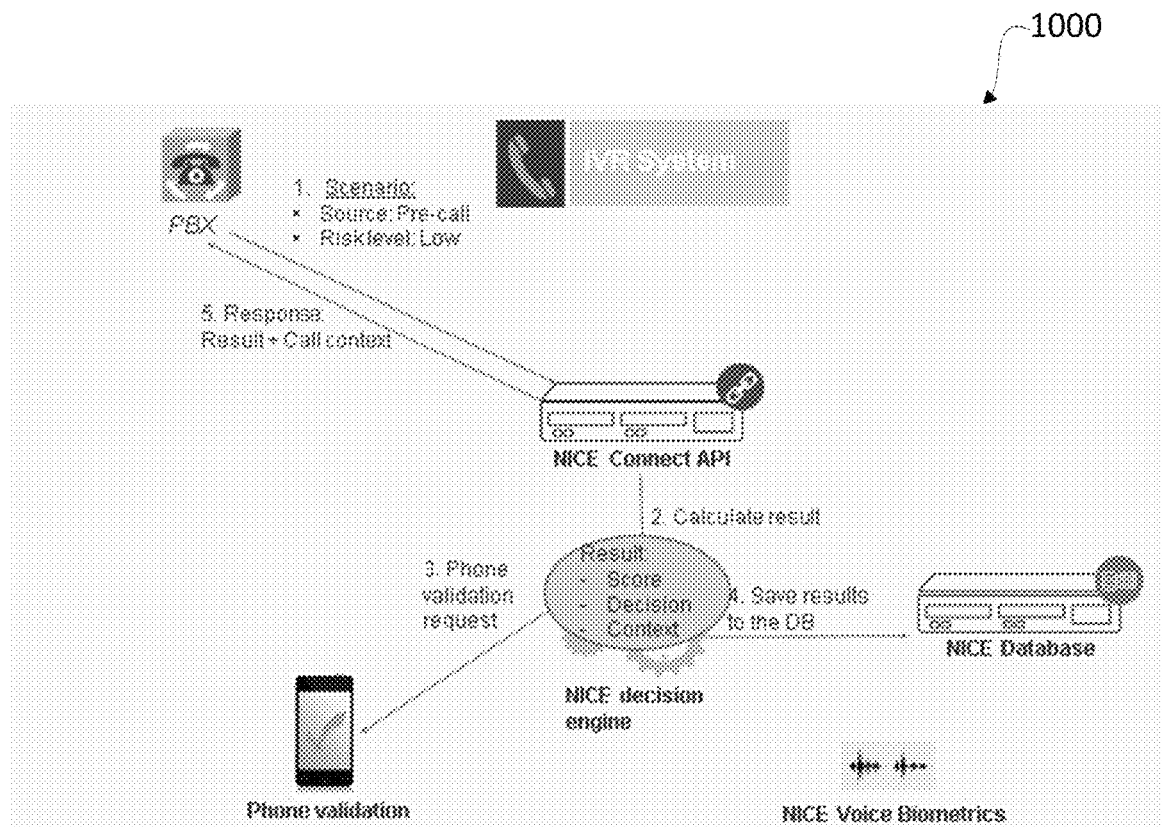
FIGS. 10A-10G show an example of a cross-channels, multi-factor flow execution, according to at least one embodiment of the invention.
Figure 10B:
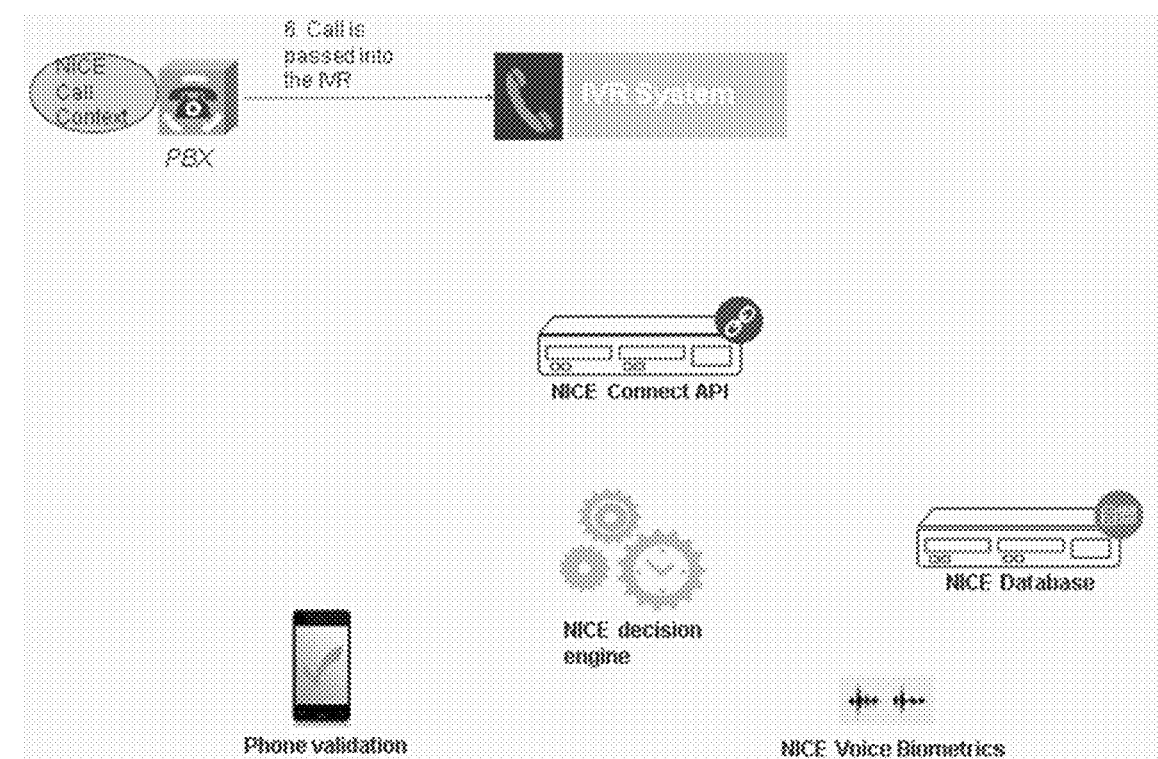

Turning to FIGS. 10A-10G, an example of a cross-channels, multi-factor flow execution 1000 is illustrated according to at least one embodiment of the invention. As shown in FIG. 10A, an interaction starts at the telephony system (PBX) at stage 1. At stage 2, the telephony system sends an authentication request via the NICE Connect API, before the call is transferred into the IVR. At stage 3, relevant authentication methods are executed by the decision engine according to the current example scenario: Phone number and SIM card validation. The results are also saved to the NICE DB—e.g., for reporting purposes or future use and/or analysis, at stage 4. And at stage 5, a NICE Call Context object is then returned to the PBX, as well as the authentication results of this phase. Turning to FIG. 10B, at stage 6, the interaction is passed from the PBX to an IVR system. As described herein, the NICE Call Context object is passed with it as additional metadata.

Figure 10C:
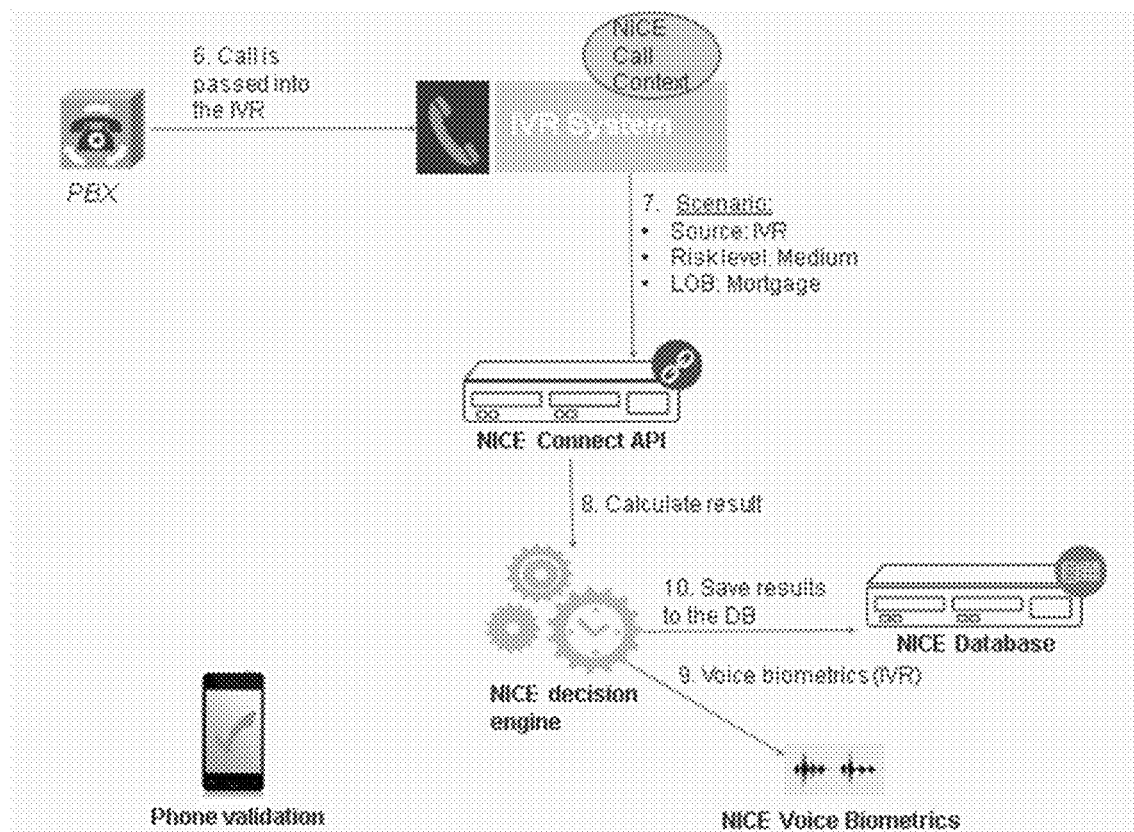
Figure 10D:
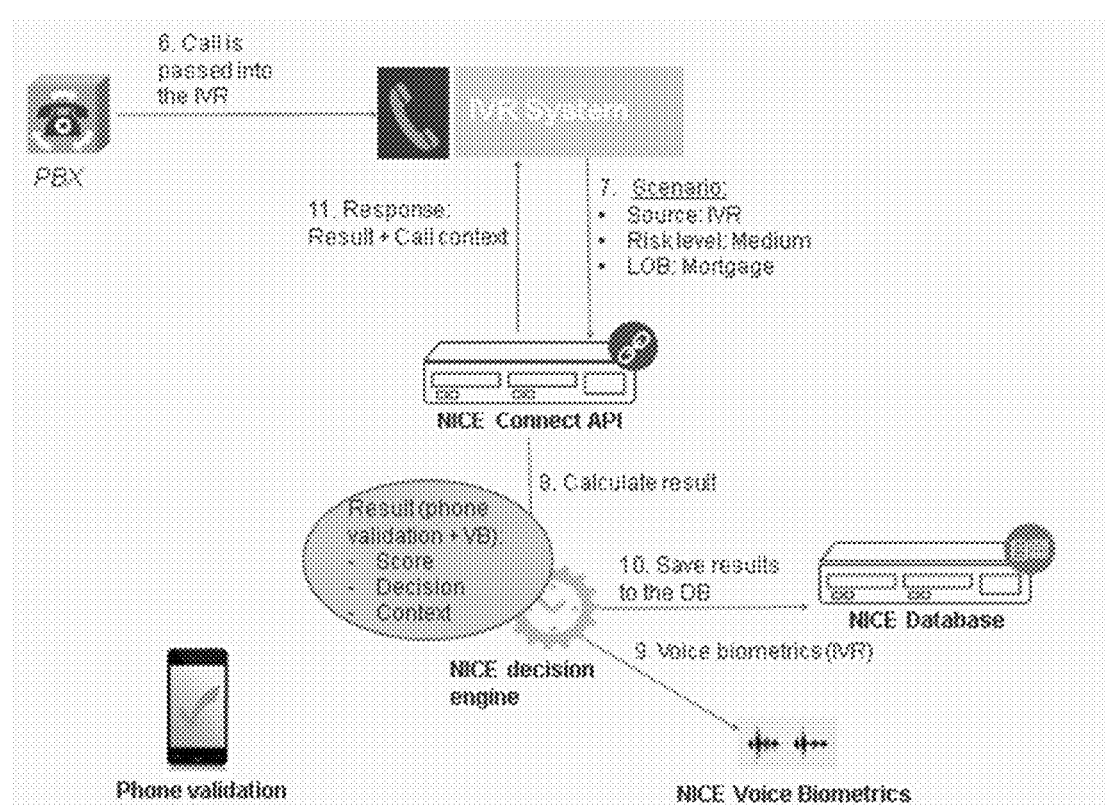

As shown in FIG. 10C, at stage 7, the IVR system sends an authentication request via the NICE Connect API. At stage 8, a request is made to execute the relevant authentication methods and for the decision engine to calculate a result according to the current scenario: Voice Biometrics with IVR. At stage 9, the relevant authentication methods are executed (in this case, Voice Biometrics with IVR), and a result is calculated based on the IVR authentication. The Decision engine calculates a new unified authentication result, basing on all the executed methods and results, and the NICE Call Context object is updated. At stage 10 the results are again saved to the NICE database, and, turning to FIG. 10D, at stage 11, the aggregated unified authentication result is returned along with the updated NICE Call Context object.

Figure 10E:
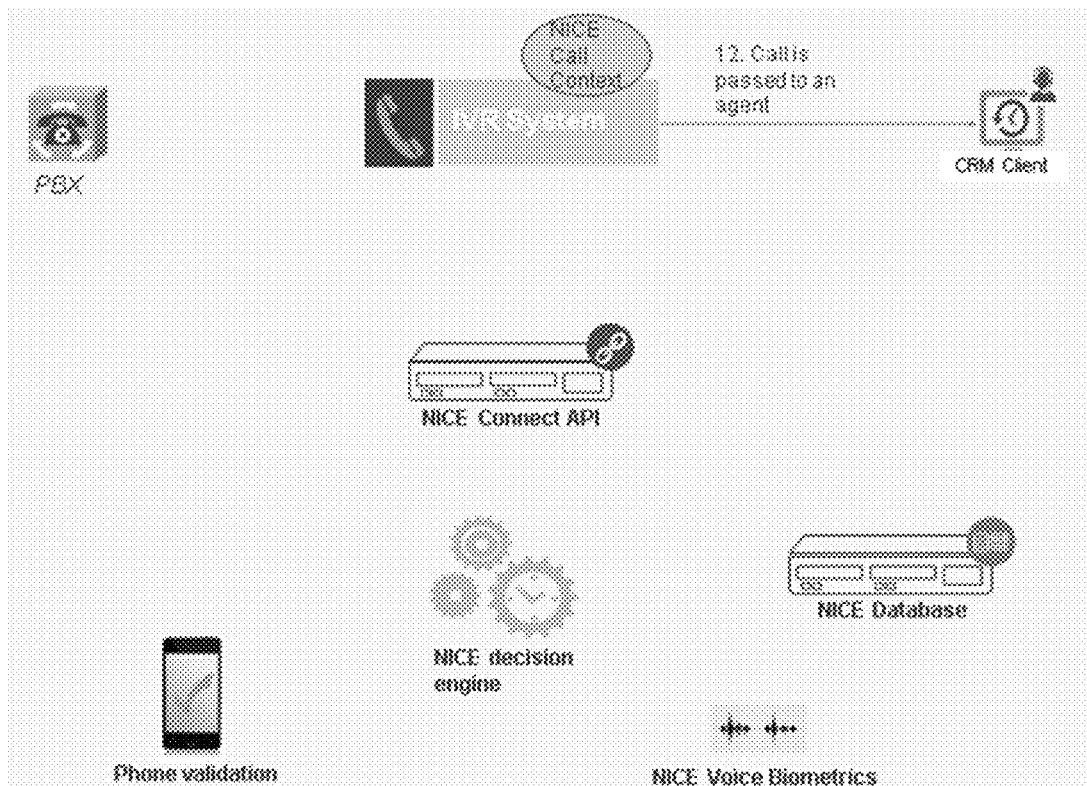
Figure 10F:
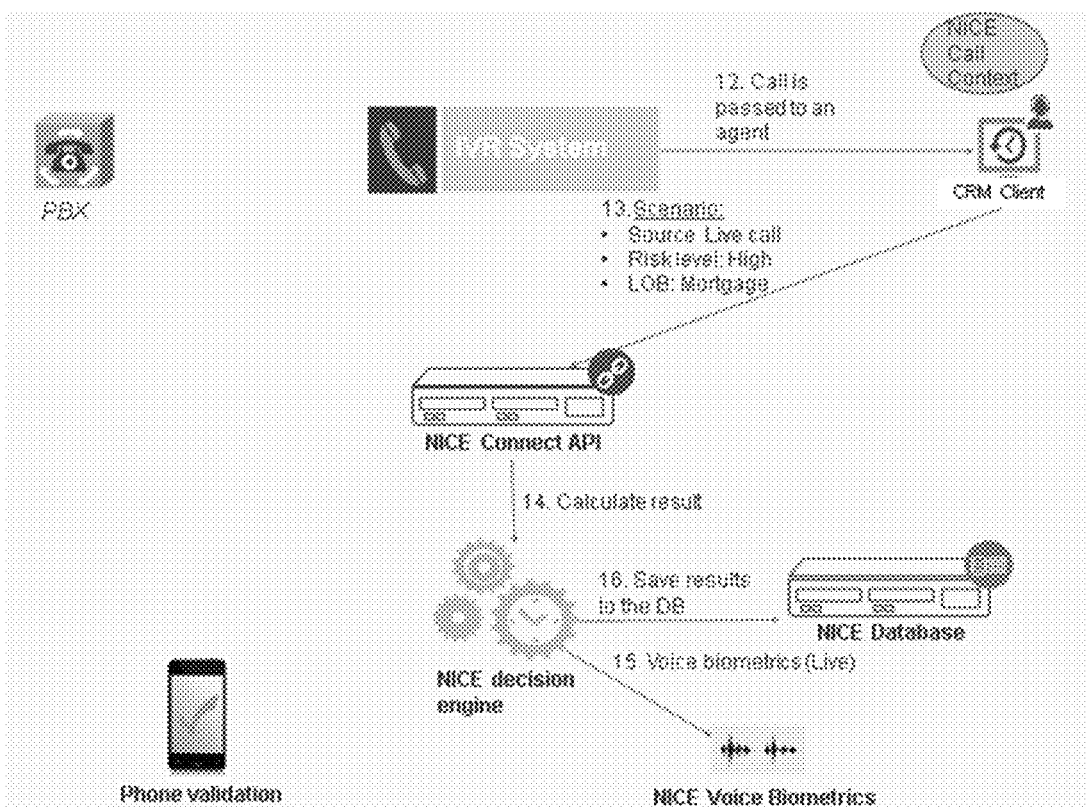
Figure 10G:
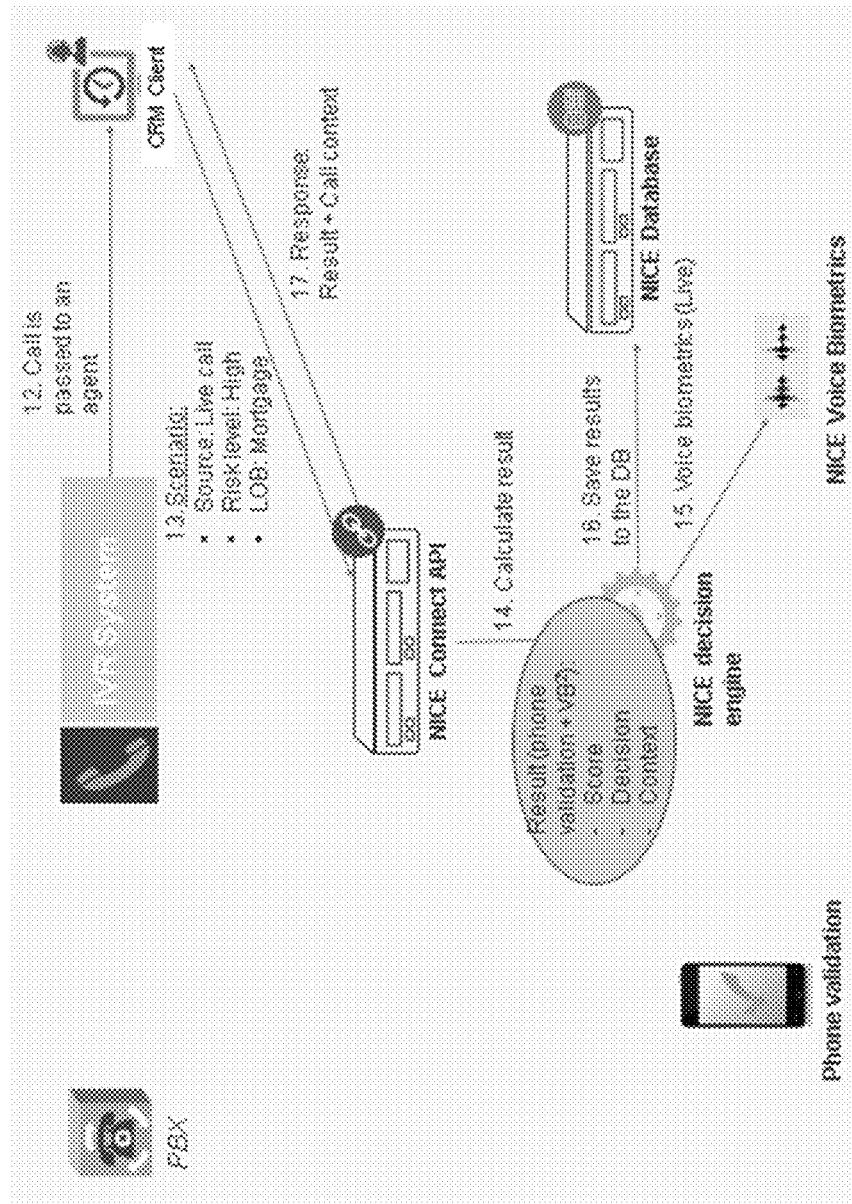

As shown in FIG. 10E, at stage 12, the interaction is then passed from the IVR to a CRM system, at which point the call has been connected to an agent, and the NICE Call Context object is passed with it as additional metadata. As shown in FIG. 10F, at stage 13, the CRM system sends an authentication request via the NICE Connect API. At stage 14, a request is made to execute the relevant authentication methods and for the decision engine to calculate a result according to the current scenario: Voice Biometrics with live call voice. At stage 15, the relevant authentication methods are executed (in this case, Voice Biometrics with live call voice), and a result is calculated based on the voice biometrics authentication. The Decision engine again calculates a new unified authentication result, basing on all the executed methods and results, and the NICE Call Context object is updated. At stage 16 the results are again saved to the NICE database, and, turning to FIG. 10G, at stage 17, the aggregated unified authentication result is returned to the CRM along with the updated NICE Call Context object. Of course, one of skill in the art will recognize that numerous combinations of authentication may be executed by various embodiments of the invention, depending on the policy executed.

In some embodiments, as the system is continuously collecting call data and usage, once enough data has been collected from multiple sources (e.g., from multiple channels), an automated usage analysis may be conducted. As a result, automated processes may be implemented to significantly improve the accuracy of the authentication and fraud detection. In some embodiments, analysis may be performed by a background process, e.g., by the Decision Engine or by some other dedicated service. Some analysis may be based on data-base procedures and/or simple thresholds. Some analysis may be based on smarter algorithms, as described herein. In some embodiments, a result of the analysis may be set to affect and change the system's setup automatically or semi-automatically. The suggested changes may be presented in a user interface, allowing an authorized user to choose from the list of suggested actions.

Over time, additional authentication and fraud detection methods may be integrated into the system. By running the ongoing automatic analysis, users may seamlessly implement these new technologies and start utilizing them knowing that they will gain better results. The analysis and suggested actions can be divided into two sub-categories:

I. Scenarios:

(A) Detection of scenarios that repeat in high volumes (above a certain threshold): (i) Prioritize the analysis of the related flows to suggest improvements (see flows section); (ii) Point out result trends to the user or BI tools.

(B) Detection of scenarios that repeat in very low volumes (below a certain threshold): (i) Point out to the user, according to a usage distribution; (ii) These are possibly misconfigured or not as common in reality as the user may have thought; (iii) Based on the calls input, the system may also suggest what to modify in the scenario's settings to increase its chances to occur. This can be easily done by finding a repeating common input among calls input data.

(C) Detection of scenarios that lead to a high authentication failure rate (above a certain threshold): (i) Point out to the user, according to a usage distribution; (ii) These may point to an ineffective authentication flow setup or a tuning problem. The system may automatically test alternative authentication methods in the background and suggest modifications to the execution flow. It may also apply the suggested modifications automatically (see flows section).

(D) Detection of scenarios that lead to a high fraudulent detection rate (above a certain threshold): (i) Point out to the user, according to a usage distribution; (ii) These point to the main business scenarios that are being targeted by fraudsters and so the system can suggest hardening the linked flows (add additional fraud detection methods) or do so automatically.

Figure 11:
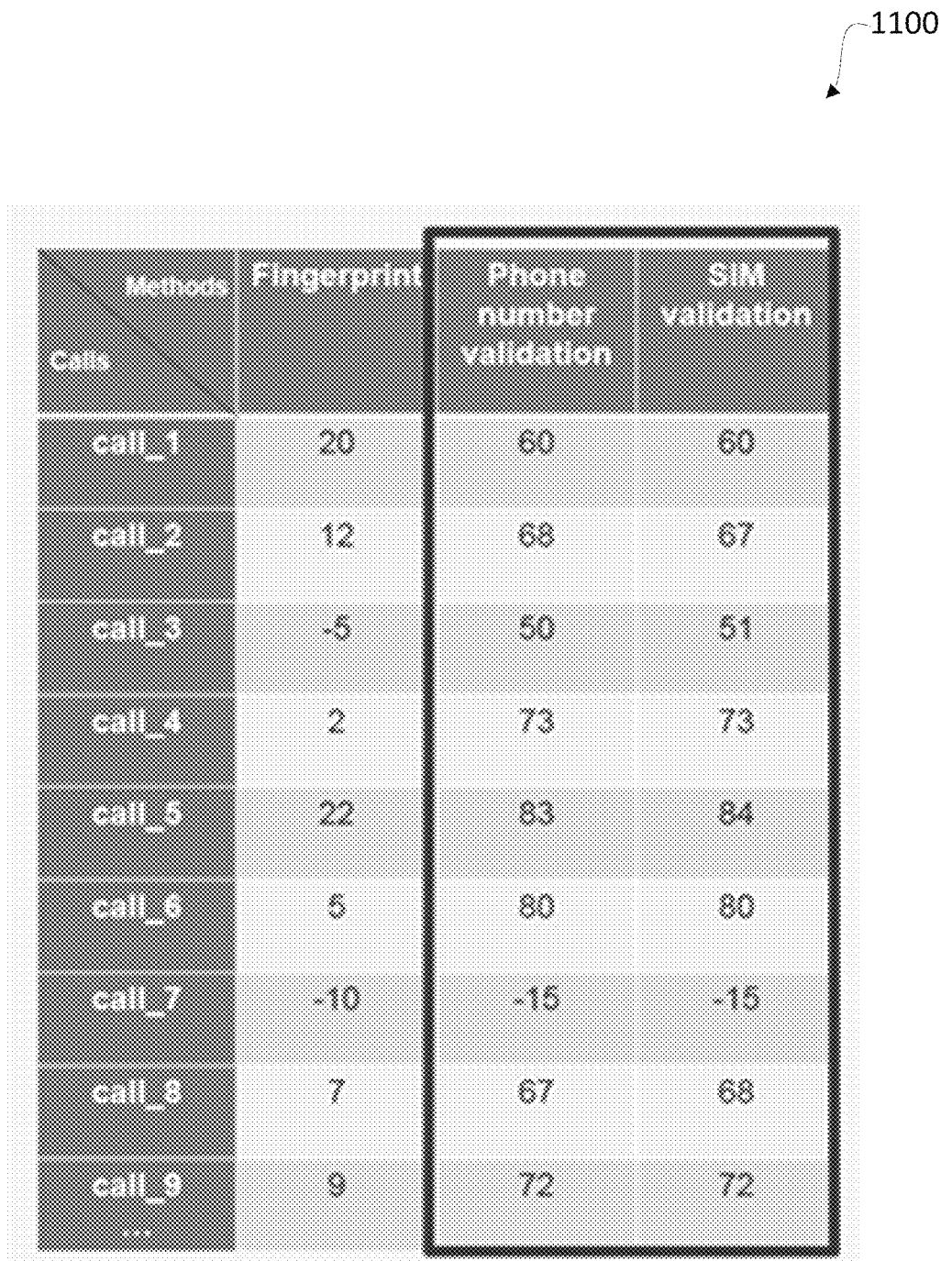
FIG. 11 shows an illustration of results of an example Redundant Methods Algorithm, according to an embodiment of the invention.

II. Authentication\Fraud Flows:

(A) Redundant authentication methods: Detection of flow trends, where certain authentication methods do not contribute to the unified authentication result. An exemplary algorithm may follow the following steps: (i) For each flow, search for individual methods that yield close authentication results—for above some X percent of the calls (e.g., when thresholds are used); (ii) If some of the methods do not actually contribute to the flow, the system may suggest removing/replacing some of the methods or may do so automatically. Turning briefly to FIG. 11, an illustration of results of an example Redundant Methods Algorithm is shown according to an embodiment of the invention.

(B) Redundant fraud detection methods: Detection of flow trends, where certain fraud detection methods do not contribute to the fraud detection result. An exemplary algorithm may follow the following steps: (i) For each flow, search for individual methods that yield close fraud detection results—for above some X percent of the calls (e.g. when thresholds are used); (ii) If some of the methods do not actually contribute to the flow, the system may suggest removing/replacing some of the methods or may do so automatically (see FIG. 11). For example, assume a flow of three authentication methods: Fingerprint, phone number validation and SIM validation. A trend analysis of X results shows that phone number validation consistently yields the same results as SIM validation. SIM validation has a slightly better average score and thus the system will recommend removing the phone validation method or exchange it with another.

(C) Best performing authentication flow: Detection of alternate execution flows that yield better results:

(i) For each Policy, the offline process may choose a certain random subset of calls and send them for the following analysis: (1) For each call, execute other authentication methods which are not currently used within the policy and save the results. Each result includes a confidence level score. (ii) Once all the calls were analyzed, compare the confidence level scores between all currently used methods and the unused methods. There may be several results and suggestions: (1) If the already used methods performed best: the system can indicate that the policy's execution flow is in its best form, reassuring the quality of the setup. (2) If there are unused methods that performed better than some of the used ones: the system may suggest exchanging methods or do so automatically. (3) If there are unused methods that performed as well as some of the used ones but are more cost-effective (cheaper): the algorithm may further include additional weights to take the cost-effect into consideration and the system may suggest exchanging methods or do so automatically, taking the cost into account.

Figure 12:
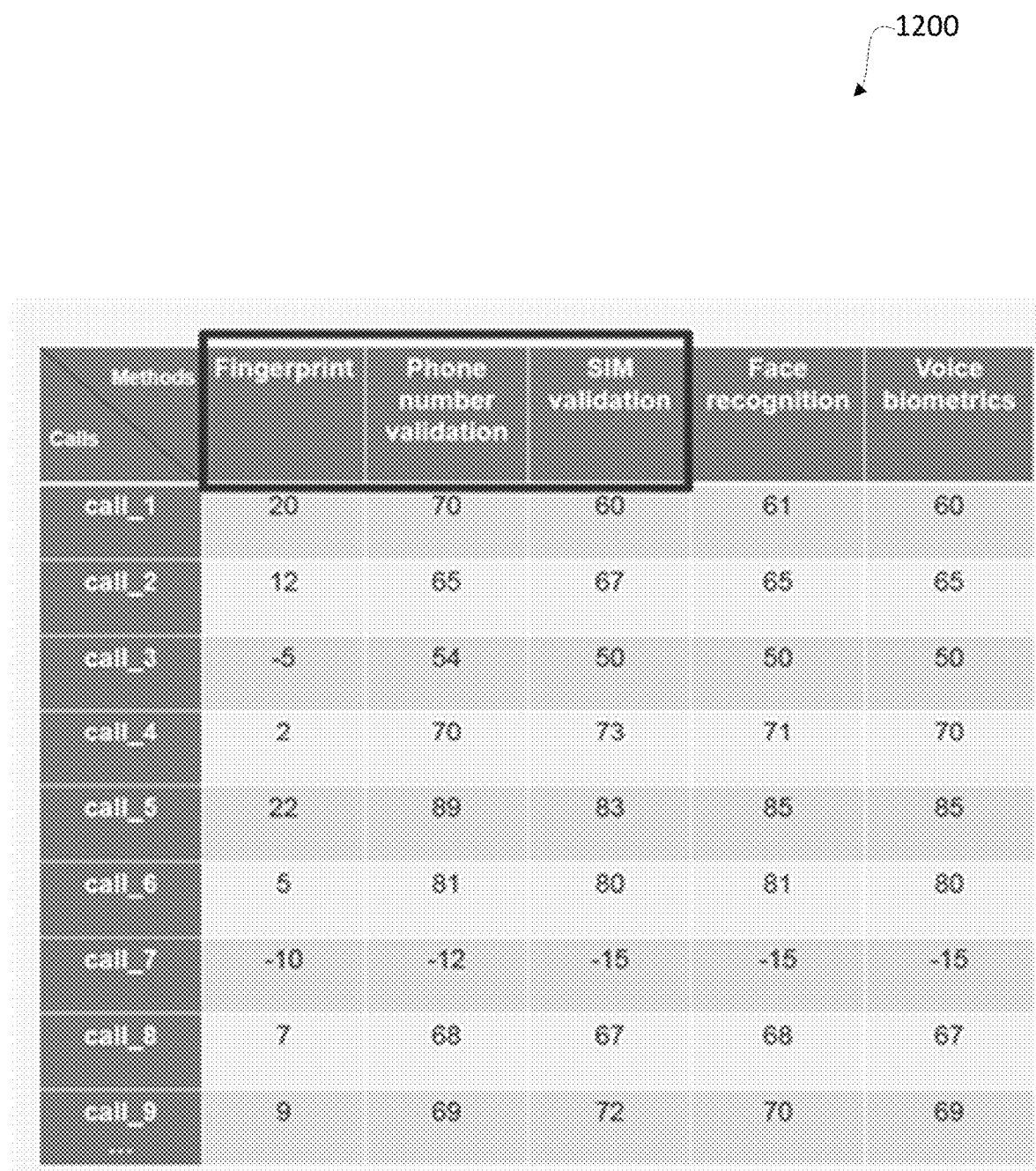
FIG. 12 shows an illustration of results of an example Best Performing Flow Algorithm, according to an embodiment of the invention.

Turning briefly to FIG. 12, an illustration of results of an example Best Performing Flow Algorithm is shown according to an embodiment of the invention.

(D) Best performing fraud detection flow: Detection of alternate execution flows that yield better results:

For each Policy, the offline process may choose a certain random subset of calls and send them for the following analysis: (1) For each call, execute other fraud detection methods which are not currently used within the policy and save the results. Each result includes a confidence level score.

(ii) Once all the calls were analyzed, compare the confidence level scores between all currently used methods and the unused methods. There may be several results and suggestions: (1) If the already used methods performed best: the system can indicate that the policy's execution flow is in its best form, reassuring the quality of the setup. (2) If there are unused methods that performed better than some of the used ones: the system may suggest exchanging methods or do so automatically. (3) If there are unused methods that performed as well as some of the used ones but are more cost-effective (cheaper): the algorithm may further include additional weights to take the cost-effect into consideration and the system may suggest exchanging methods or do so automatically, taking the cost into account.

Figure 13:
FIG. 13 shows an illustration of results of an example Best Performing Flow Auto-Enhancement Algorithm, according to an embodiment of the invention.

Turning briefly to FIG. 13, an illustration of results of an example Best Performing Flow Auto-Enhancement Algorithm is shown according to an embodiment of the invention.

In some embodiments, after gathering all scores, the system learns that on average, the confidence scores of Face recognition and Voice biometrics were found to be higher than Fingerprint. Face recognition average score is slightly higher than Voice biometrics, however, assume that Voice biometrics method is considered 3 times cheaper than Face recognition. The cost of Voice biometrics is represented by weight V, while Face recognition is represented by weight F. Therefore: $3V=F$. The scores of both methods are very close and therefore Voice biometrics is chosen by the algorithm.

In some embodiments, the system may automatically exchange the methods and/or provide an option for the user to choose. In some embodiments, the algorithm may be set to give priority to the highest scoring method and disregard the cost-weight effect. In such a setup, the algorithm may choose Face recognition in the example above. In some embodiments, the algorithm may further consider families of authentication methods, for example: 'Something you are', 'something you have' and 'something you know'—making sure to only exchange methods within the same authentication family groups.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other

What is claimed is:

1. A method for generating and implementing a real-time multi-factor authentication policy across multiple channels, the method performed on a computer having a processor, memory, and one or more code sets stored in the memory and executing by the processor, the method comprising:
   during a pre-authentication stage:
      receiving, via a user interface, information defining one or more scenarios;
      receiving, via the user interface, information defining one or more authentication flows;
      for each of the one or more scenarios, mapping, by the processor, one of the one or more authentication flows to a given scenario; and
      generating a real-time multi-factor authentication policy associated with each of the one or more scenarios; and
   during a real-time authentication stage:
      upon receiving an interaction, identifying, by a decision engine, a relevant scenario of the one or more scenarios;
      implementing, by the decision engine, the real-time multi-factor authentication policy associated with the relevant scenario; and
      determining, by the decision engine, an authentication result.

2. The method as in claim 1, wherein information defining one or more scenarios comprises at least one scenario parameter and at least one corresponding parameter value.

3. The method as in claim 1, wherein a given authentication flow comprises:
   at least one analysis vertex, wherein the at least one analysis vertex represents one of a collection of available authentication methods to execute during a real-time authentication stage;
   at least one condition vertex, wherein the at least one condition vertex represents a matrix containing a collection of one or more predicates defining one or more conditions for a given result of each authentication method; and
   at least one decision vertex, wherein the at least one decision vertex represents one of a plurality of potential authentication results of a given authentication flow.

4. The method as in claim 3, wherein the authentication result is satisfied if all predicates in the collection of one or more predicates are determined to be true.

5. The method as in claim 1, wherein a given authentication flow is mapped to a scenario based on a user indication linking the authentication flow and the scenario.

6. The method as in claim 1, wherein an authentication result indicates a relative strength of the authentication.

7. The method as in claim 1, further comprising:
   determining a fraud suspicion level result based on implementation of the real-time multi-factor authentication policy, wherein the fraud suspicion level result indicates a relative level of suspicion of fraud.

8. The method as in claim 3, further comprising:
   providing to the user, via the user interface, an authentication flow generator, the authentication flow generator comprising:
   one or more authentication method selection boxes for selecting one or a plurality of authentication methods;
   one or more condition selection boxes for selecting one or more of a plurality of conditions to be associated with a given authentication method;
   one or more predicate selection boxes for selecting one or more of a plurality of predicates to be associated with a given condition; and
   one or more decision selection boxes for selecting a potential authentication result to be associated with the given authentication method.

9. The method as in claim 1, wherein one or more authentication flows is executed at least one of in parallel and in series.

10. The method as in claim 2, further comprising:
    monitoring by the decision engine, a frequency with which a scenario is identified;
    prioritizing the scenario when the frequency meets a predefined threshold; and
    modifying at least one scenario parameter or at least one corresponding parameter value when the frequency does not meet the predefined threshold.

11. The method as in claim 2, further comprising:
    monitoring by the decision engine, an authentication failure rate of the real-time multi-factor authentication policy associated with the relevant scenario; and
    when the authentication failure rate meets a predefined threshold, modifying, by the decision engine, at least one authentication flow mapped to the given scenario.

12. The method as in claim 7, further comprising:
    monitoring by the decision engine, a fraudulent detection rate of the real-time multi-factor authentication policy associated with the relevant scenario;
    when the fraudulent detection rate does not meet a predefined threshold, modifying, by the decision engine, at least one authentication flow mapped to the given scenario; and
    when the fraudulent detection rate meets a predefined threshold, prioritizing the relevant scenario.

13. A system for generating and implementing a real-time multi-factor authentication policy across multiple channels, comprising:
    a computer having a processor and memory; and
    one or more code sets stored in the memory and executing by the processor, which configure the processor to:
    during a pre-authentication stage:
       receive, via a user interface, information defining one or more scenarios;
       receive, via the user interface, information defining one or more authentication flows;
       for each of the one or more scenarios, map one of the one or more authentication flows to a given scenario; and
       generate a real-time multi-factor authentication policy associated with each of the one or more scenarios; and
    during a real-time authentication stage:
       upon receiving an interaction, identify, by a decision engine, a relevant scenario of the one or more scenarios;
       implement, by the decision engine, the real-time multi-factor authentication policy associated with the relevant scenario; and
       determine, by the decision engine, an authentication result.

14. The system as in claim 13, wherein information defining one or more scenarios comprises at least one scenario parameter and at least one corresponding parameter value.

15. The system as in claim 13, wherein a given authentication flow comprises:
- at least one analysis vertex, wherein the at least one analysis vertex represents one of a collection of available authentication methods to execute during a real-time authentication stage;
- at least one condition vertex, wherein the at least one condition vertex represents a matrix containing a collection of one or more predicates defining one or more conditions for a given result of each authentication method; and
- at least one decision vertex, wherein the at least one decision vertex represents one of a plurality of potential authentication results of a given authentication flow.

16. The system as in claim 15, wherein the authentication result is satisfied if all predicates in the collection of one or more predicates are determined to be true.

17. The system as in claim 13, wherein a given authentication flow is mapped to a scenario based on a user indication linking the authentication flow and the scenario.

18. The system as in claim 13, wherein an authentication result indicates a relative strength of the authentication.

19. The system as in claim 13, wherein the processor is further configured to:
- determine a fraud suspicion level result based on implementation of the real-time multi-factor authentication policy, wherein the fraud suspicion level result indicates a relative level of suspicion of fraud.

20. The system as in claim 15, wherein the processor is further configured to:
- provide to the user, via the user interface, an authentication flow generator, the authentication flow generator comprising:
  - one or more authentication method selection boxes for selecting one or more of a plurality of authentication methods;
  - one or more condition selection boxes for selecting one or more of a plurality of conditions to be associated with a given authentication method;
  - one or more predicate selection boxes for selecting one or more of a plurality of predicates to be associated with a given condition; and
  - one or more decision selection boxes for selecting a potential authentication result to be associated with the given authentication method.

21. The system as in claim 13, wherein one or more authentication flows is executed at least one of in parallel and in series.

22. The system as in claim 14, further configured to:
- monitor by the decision engine, a frequency with which a scenario is identified;
- prioritize the scenario when the frequency meets a predefined threshold; and
- modify at least one scenario parameter or at least one corresponding parameter value when the frequency does not meet the predefined threshold.

23. The system as in claim 14, further configured to:
- monitor by the decision engine, an authentication failure rate of the real-time multi-factor authentication policy associated with the relevant scenario; and
- when the authentication failure rate meets a predefined threshold, modify, by the decision engine, at least one authentication flow mapped to the given scenario.

24. The system as in claim 19, further comprising:
- monitoring by the decision engine, a fraudulent detection rate of the real-time multi-factor authentication policy associated with the relevant scenario;
- when the fraudulent detection rate does not meet a predefined threshold, modifying, by the decision engine, at least one authentication flow mapped to the given scenario; and
- when the fraudulent detection rate meets a predefined threshold, prioritizing the relevant scenario.

* * * * *